(12) United States Patent
Ribbens

(10) Patent No.: US 11,364,923 B2
(45) Date of Patent: Jun. 21, 2022

(54) FAILURE DETECTION AND RESPONSE

(71) Applicant: The Regents of the University of Michigan, Ann Arbor, MI (US)

(72) Inventor: William B. Ribbens, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 94 days.

(21) Appl. No.: 16/612,293

(22) PCT Filed: May 10, 2018

(86) PCT No.: PCT/US2018/032104
§ 371 (c)(1),
(2) Date: Nov. 8, 2019

(87) PCT Pub. No.: WO2018/209112
PCT Pub. Date: Nov. 15, 2018

(65) Prior Publication Data
US 2021/0276576 A1    Sep. 9, 2021

Related U.S. Application Data

(60) Provisional application No. 62/602,876, filed on May 8, 2017.

(51) Int. Cl.
*B60W 50/02* (2012.01)
*G07C 5/00* (2006.01)
(Continued)

(52) U.S. Cl.
CPC .... *B60W 50/0205* (2013.01); *B60W 50/0225* (2013.01); *B60W 50/14* (2013.01);
(Continued)

(58) Field of Classification Search
CPC ......... B60W 50/0205; B60W 50/0225; B60W 50/14; B60W 2050/021; B60W 2050/146; G07C 5/008; G07C 5/0816
(Continued)

(56) References Cited

U.S. PATENT DOCUMENTS

2002/0193920 A1  12/2002  Miller et al.
2004/0034504 A1   2/2004  Ulrich et al.
(Continued)

FOREIGN PATENT DOCUMENTS

JP    2004272375 A   9/2004
JP    2009146086 A   7/2009

OTHER PUBLICATIONS

R. N. Riggins et al., "Designed Inputs for Detection and Isolation of Failures in The State Transition Matrices of Dynamic Systems", IEEE Transactions on Control Systems Technology, US, vol. 5, No. 2, dated Mar. 1, 1997, pp. 149-162.
(Continued)

*Primary Examiner* — Gertrude Arthur Jeanglaude
(74) *Attorney, Agent, or Firm* — Reising Ethington P.C.

(57) ABSTRACT

A system and method of detecting and responding to a failure of one or more vehicle components, the method including: receiving system input at a failure detection module regarding the one or more vehicle components; determining a system state through use of one or more onboard vehicle sensors; obtaining a nominal state transition matrix and a nominal state input matrix; calculating a present state transition matrix estimate and a present state input matrix estimate based on the nominal state transition matrix, the nominal state input matrix, the system input, and a sampled state derivative; detecting a failure of at least one of the vehicle components based on one or more component parameters of the present state transition matrix estimate
(Continued)

and/or the present state input matrix estimate; and performing a vehicle action in response to the detection of the failure.

20 Claims, 6 Drawing Sheets

(51) Int. Cl.
  *B60W 50/14* (2020.01)
  *G07C 5/08* (2006.01)
(52) U.S. Cl.
  CPC ............ *G07C 5/008* (2013.01); *G07C 5/0816* (2013.01); *B60W 2050/021* (2013.01); *B60W 2050/146* (2013.01)
(58) Field of Classification Search
  USPC .......................................................... 701/29.2
  See application file for complete search history.

(56) References Cited

U.S. PATENT DOCUMENTS

| | | | |
|---|---|---|---|
| 2007/0005202 A1* | 1/2007 | Breed | .................... G07C 5/008 |
| | | | 701/29.1 |
| 2007/0126561 A1* | 6/2007 | Breed | ................. B60R 25/2081 |
| | | | 340/426.13 |
| 2010/0057290 A1 | 3/2010 | Brillhart et al. | |

OTHER PUBLICATIONS

W. B. Ribbens et al., "Detection and Isolation of Plant Failures in Dynamic Systems", dated Jun. 1, 1991, pp. 1514-1521.
European Search Report corresponding to European Application No. EP 18 79 8467, dated Jan. 26, 2021, 7 pages.
International Search Report corresponding to International application No. PCT/US2018/032104, dated Sep. 6, 2018, 3 pages.
Written Opinion corresponding to International application No. PCT/US2018/032104, dated Sep. 6, 2018, 10 pages.

* cited by examiner

FAILURE DETECTION AND RESPONSE

TECHNICAL FIELD

This invention relates to methods and systems for detecting and identifying failures or impending failures in vehicle components.

BACKGROUND

Over the service life of a vehicle, many components and subsystems can experience wear, damage, and other degradation over time. While various approaches may be used to identify certain failed components, other types of components may be more difficult to diagnose. It may also be difficult to identify a component that is failing (or degrading) before the component has completely failed.

SUMMARY

According to one aspect of the invention, there is provided a method of detecting and responding to a failure of one or more vehicle components, the method including: receiving system input at a failure detection module regarding the one or more vehicle components; determining a system state through use of one or more onboard vehicle sensors, wherein the system state relates to the one or more vehicle components; obtaining a nominal state transition matrix and a nominal state input matrix; calculating a present state transition matrix estimate and a present state input matrix estimate based on the nominal state transition matrix, the nominal state input matrix, the system input, and a sampled state derivative; detecting a failure of at least one of the vehicle components based on one or more component parameters of the present state transition matrix estimate and/or the present state input matrix estimate, wherein the one or more component parameters pertain to the at least one vehicle component; and performing a vehicle action in response to the detection of the failure.

According to various embodiments, this method may further include any one of the following features or any technically-feasible combination of some or all of these features:

the detecting step further includes comparing the one or more component parameters of the present state transition matrix estimate and/or a present state input matrix estimate for a first vehicle component to a tolerance range for the first vehicle component;

the detecting step further includes detecting whether the failure is an instant failure or a gradual failure;

the performing step further includes: when it is detected that the failure is a current failure, issuing an instant alarm to a vehicle operator such that the issuance of the instant alarm constitutes the vehicle action; and when it is detected that the failure is a gradual failure, estimating a time to failure (TTF) and reporting the TTF to the vehicle operator or a vehicle services facility such that the estimation and report of the TTF constitutes the vehicle action;

the one or more components are represented using a state variable model, wherein the state variable model is given by: $\dot{x}_k = A_i x_k + B_i u_k$, where $x_k$ is the system state at time k, $u_k$ is the system input at time k, $A_i$ is a present state transition matrix, $B_i$ is a present state input matrix, and $\dot{x}_k$ is the sampled state derivative at time k;

the present state transition matrix estimate $\hat{A}_i$ and the present input value estimate $\hat{B}_i$ are calculated by: estimating the sampled state derivative $\dot{x}_k$ based on measurements of the system state $x_k$ via at least some of the onboard vehicle sensors; calculating a present state transition matrix deviation $\Delta A$ and a present state input matrix deviation $\Delta B$ using the equation: $\Delta A x_k + \Delta B u_k = \dot{x}_k - A_s x_k - B_s u_k$, where $A_S$ is the nominal state transition matrix and $B_S$ is the nominal state input matrix, wherein $\hat{A}_i = A_S + \Delta A$ and $\hat{B}_i = B_S + \Delta B$;

the estimating step includes estimating the sampled state derivative $\dot{x}_k$ using the following equation:

$$\dot{x}_k = \frac{1}{2}\left[\frac{(x_{k+1} - x_k)}{(t_{k+1} - t_k)} + \frac{(x_k - x_{k-1})}{(t_k - t_{k-1})}\right],$$

where $x_{k+1}$ is the system state at time sample k+1, $x_{k-1}$ is the system state at time sample k−1, $t_k$ is the time at time sample k, $t_{k+1}$ is the time at time sample k+1, and $t_{k-1}$ is the time at time sample k−1;

the onboard vehicle sensors include at least one vehicle system sensor and at least one supplemental sensor, wherein the system state is represented by one or more system state variables, and wherein each of the one or more system state variables is provided by at least one of the onboard vehicle sensors;

synchronizing the at least one vehicle system sensor with the at least one supplemental sensor so that sensor values associated with the at least one vehicle system sensor and the at least one supplemental sensor are synchronized with respect to time, wherein the synchronization step includes carrying out a time synchronization process for one or more of the at least one vehicle system sensor(s);

the time synchronizing process includes carrying out each of the following steps for each of the one or more vehicle system sensor(s): obtaining a set of sensor values, wherein the set of sensor values includes a plurality of sensor values that are each taken at different times over a sample time interval; using a polynomial modeling technique to obtain a polynomial model of the set of sensor values over the sample time interval; and deriving one or more adjusted sensor values from the polynomial model that correspond in time to the sensor values associated with the at least one supplemental sensor; and/or the receiving, determining, obtaining, and calculating steps comprise a parameter estimation process, wherein the detecting step is carried out using a failure detection filter (FDF), and wherein the FDF uses the present state transition matrix estimate and the present state input matrix estimate obtained from the parameter estimation process to carry out the detecting step.

According to another aspect of the invention, there is provided a method of configuring a vehicle to detect and respond to a failure of one or more vehicle components, the method including: constructing a state variable analytical model for a system under monitoring (SUM); identifying system sensors that can be used to measure at least some state variables of the state variable analytical model; developing a time synchronization process that is particular to the identified system sensors, wherein the time synchronization process enables sensor values obtained by the system sensors to be adjusted so as to obtain adjusted sensor values, wherein the adjusted sensor values conform to a unified sample time; developing a parameter estimation process that can be used to obtain a present state transition matrix estimate and a present state input matrix estimate, wherein the parameter estimation process is developed based on the constructed state variable analytical model; and configuring vehicle electronics of the vehicle to carry out the parameter estimation process and the time synchronization process.

According to various embodiments, this method may further include any one of the following features or any technically-feasible combination of some or all of these features:
- compiling the parameter estimation process and the time synchronization process into a computer program;
- the configuring step includes installing the computer program into the vehicle electronics of the vehicle;
- the steps of: identifying one or more state variables of the state variable analytical model in which the vehicle is incapable of measuring using the system sensors; and providing one or more supplemental sensors to measure the identified state variables, wherein the one or more supplemental sensors are configured to provide sensor values containing information relating to the identified state variables to the parameter estimation process; and/or
- the development of the parameter estimation process includes constructing a nominal state transition matrix and a nominal state input matrix;

According to yet another aspect of the invention, there is provided a vehicle failure detection system, including: a system under monitoring (SUM) that includes one or more vehicle electronic system components; one or more onboard vehicle sensors; a failure detection module that includes: (i) a failure detection system (FDS) signal processor; and (ii) a memory containing a computer program; and a communication link between the failure detection model and the SUM; wherein the failure detection module is configured to execute the computer program that is stored in the memory of the vehicle failure detection system using the failure detection signal processor, and wherein execution of the computer program by the failure detection signal processor causes the failure detection module to: (a) receive system input regarding the one or more vehicle electronic system components; (b) determine a system state through use of the one or more onboard vehicle sensors, wherein the system state concerns the one or more state variables; (c) obtain a nominal state transition matrix and a nominal state input matrix; (d) calculate a present state transition matrix estimate and a present state input matrix estimate based on the nominal state transition matrix, the nominal state input matrix, the system input, and a sampled state derivative; (e) detect a failure of at least one of the vehicle electronic system components based on one or more component parameters of the present state transition matrix estimate and/or the present state input matrix estimate, wherein the one or more component parameters pertain to the at least one vehicle electronic system component; and (f) perform a vehicle action in response to the detection of the failure.

According to various embodiments, this system may further include any one of the following features or any technically-feasible combination of some or all of these features:
- the one or more onboard vehicle sensors are either or both of system sensors or supplemental sensors, wherein the supplemental sensors are a part of the failure detection module, and wherein the system sensors are either or both of sensors included as a part of the SUM or other system sensors;
- the communication link is a direct, hardwired connection between the failure detection model and the SUM;
- the communication link is a vehicle communications bus.

In other embodiments, the system and methods defined above can be utilized in other (non-vehicular) applications that involve an electronics-based system having sensors that provide the system state variable inputs needed to detect a failure of whatever component is being monitored.

BRIEF DESCRIPTION OF THE DRAWINGS

One or more aspects of the disclosure will hereinafter be described in conjunction with the appended drawings, wherein like designations denote like elements, and wherein.

DETAILED DESCRIPTION

Figure 1:
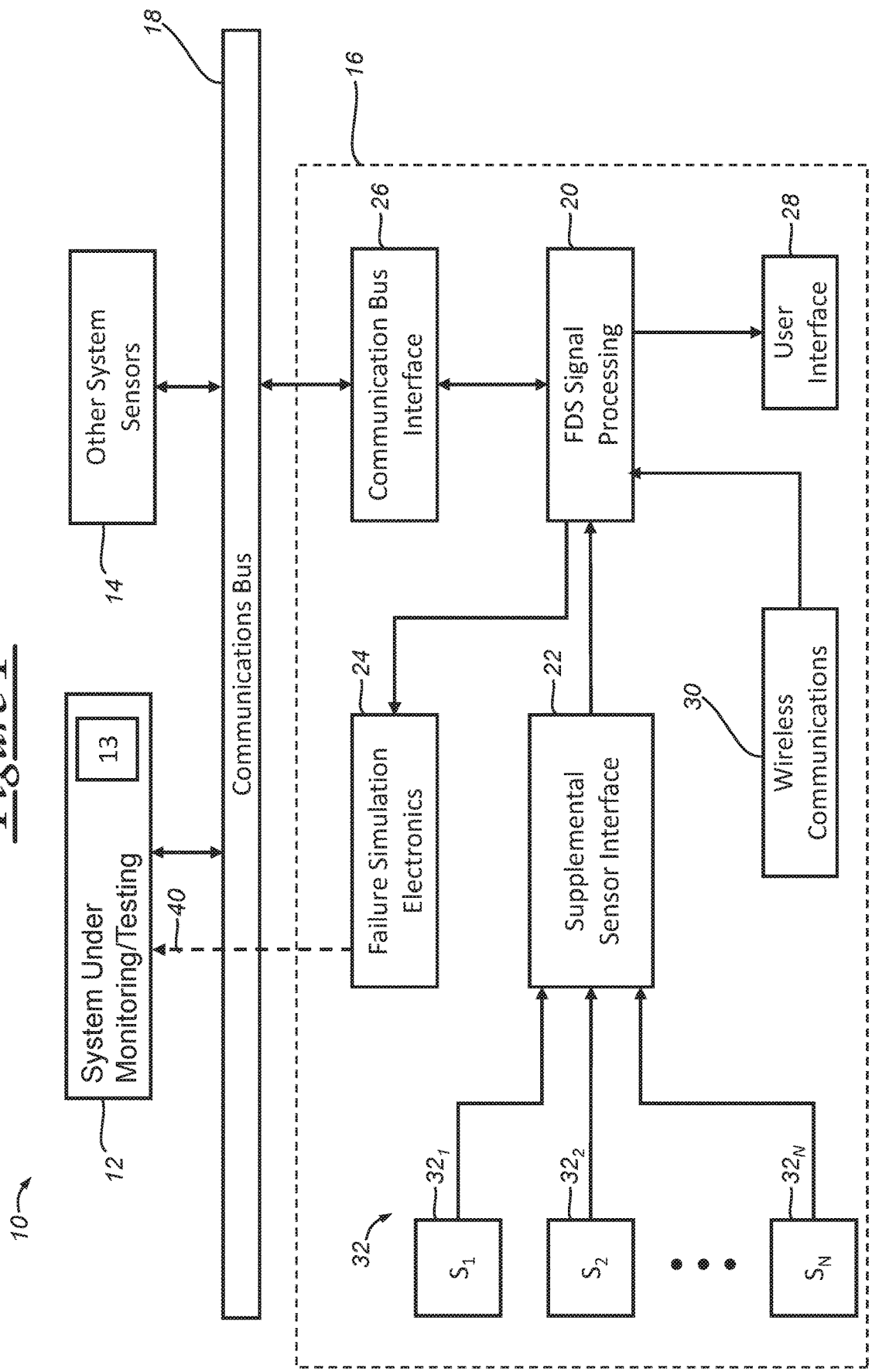
FIG. 1 is a block diagram of an embodiment of a failure detection system.

The system and method described herein can be used to detect and respond to failures (and/or impending failures) in individual components and/or subsystems that are part of a larger vehicle electronic system, but may be applied more broadly to other (non-vehicle) applications. In many embodiments, a component of a system can be modeled using various techniques so as to obtain state variable analytical representations of the component. These state representations can be in the form of a state variable model that is based on state transfer functions, as discussed more below. After models are developed, a computer program or application can be compiled based on particular algorithms/equations that represent the system under monitoring (SUM). The SUM is the component or subsystem that is being monitored by the failure detection system (FDS) discussed herein. The SUM can include one or more electronic components and/or electromechanical components (e.g., actuators). As used herein, a "component" may be an individual component or may be a subsystem of two or more individual components. The SUM is a component and, thus, can be a single (individual) component or a subsystem. The parameter estimation method discussed below can be used to estimate component parameters. In the case that the SUM is a subsystem in which the SUM includes two or more individual components, then the component parameters can concern an individual component included as a part of the subsystem, two or more individual components included as a part of the subsystem, or the entire subsystem.

In one embodiment, a failure detection system (FDS) (or failure detection module) can be installed in the electronic system, or otherwise communicatively coupled thereto. The FDS (or FDM) can obtain information from the SUM, including inputs, outputs, and/or other system information. In one embodiment, the FDS (or FDM) can also incorporate one or more supplemental sensors to aid or to enable determination of one or more measurements to be used in the parameter estimation process discussed below. The parameter estimation process involves using the state variable analytical model to obtain the present state transition matrix estimate $\hat{A}_i$ and/or the present state input matrix $\hat{B}_i$. Parameter values contained in these estimates (which can be in the form of matrices) are then extracted and compared to a threshold range. When a complete failure is detected, a notification or warning can be sent to a user or operator of the system. In other embodiments, when a component has not completely failed, but is considered "failing," then a time to failure (TTF) can be calculated using a time to failure estimation process, as discussed in more detail below. Additionally, the methods and/or systems discussed below can use a sensor time synchronization process that synchronizes sensor readings from various sensors of the system, including those that are a part of the SUM, other system sensors, and any supplemental sensors being used (collectively, "onboard sensors").

With reference to FIG. 1, there is shown an embodiment of a failure detection system (FDS) 10. The FDS 10 includes a system under monitoring (SUM) 12, other system sensors 14, a failure detection module (FDM) 16, and a communication bus 18. The SUM 12 is the system that is being monitored for current or impending failures and can include one or more individual components. The SUM 12 can include zero or more SUM sensors 13 and, in the case that the SUM 12 includes one or more sensors, these sensors 13 can be system sensors. As used herein, "system sensors" includes sensors that are included in the SUM 12 or a part of the overall system 10 that are designed to carry out the objectives and/or task(s) of the electronic system. The other system sensors 14 are system sensors that are a part of the overall system 10, but are not a part of the SUM 12. As an example, where the FDS 10 is being used on a vehicle to monitor one or more components of the vehicle, system sensors 13 and 14 would be a part of the OEM installed vehicle electronics that are used for vehicle operations, with sensors 13 being part of the component under test (part of the SUM 12) and sensors 14 being part of the remaining vehicle electronics.

The communication bus 18 is a hardwired electronic communication bus. However, it should be appreciated that the communication bus 18 can be any of a variety of electronic communication mechanisms, including those using wireless communications, as discussed more below. And, in some embodiments, the system 10 can include a hardwired communication bus 18, as well as a separate wireless communications module 30 that can be connected to the communication bus 18 and that can be used for communications within the system 10 and/or used with other external (or remote) components (not shown).

The failure detection module (FDM) 16 is shown as including a failure detection system (FDS) signal processing module 20, a supplemental sensor interface 22, failure simulation electronics 24, a communication bus interface 26, a user interface 28, a wireless communications interface 30, and one or more supplemental sensors 32. These parts and/or devices of the failure detection module 16 can be included into a dedicated electronic module that is included in the system 10 for purposes of identifying failures of the SUM 12 and/or the method discussed herein. In other embodiments, the FDM 16 can be incorporated into one or more already existing portions or devices such as through configuring the one or more pre-existing individual components (e.g., components of the SUM 12 or another component separate from the SUM 12) so that these individual components carry out the method discussed herein. And, in yet another embodiment, various parts of the FDM 16 can be incorporated into a dedicated module and others can be incorporated (or configured) into other, pre-existing components of the system 10. Moreover, it should be appreciated that the dedicated module can be a single module or, in other embodiments, the FDM 16 can be incorporated into multiple dedicated modules.

The failure simulation electronics 24 can be used during development and testing of the failure detection system 10 and/or the failure detection module 16. The failure simulation electronics 24 provides a mechanism for assessing the FDS performance during the design and development phase. The failure simulation electronics 24 is not a part of the final FDS 10 when the FDS 10 (or the system into which the FDS 10 is incorporated) is in use by a consumer—that is, for example, when the FDS is used in the context of a vehicle system, the failure simulation electronics 24 would not be a part of the production vehicle. The failure simulation electronics 24 permits failures in components, including key components, to be simulated electronically and permits the performance of the FDS for detecting and/or identifying failures to be measured and/or otherwise evaluated.

FIG. 1 depicts a separate and direct communication link 40 between the FDM 16 and an electronic system, namely the SUM 12. The direct communication link 40 is shown as being connected to the SUM 12 and the failure simulation electronics 24, which can be the case when the FDS 10 and/or FDM 16 is being developed and/or tested. However, as mentioned above, systems in production for use by an end consumer or user do not include the failure simulation electronics 24, at least in many embodiments. Thus, in such instances, the FDS 10 can include the direct communication link 40 between the SUM 12 and another part (or device) of the FDM 12, such as the failure FDS signal processing module 20.

As mentioned, the SUM 12 can include one or more individual components and, in some embodiments, can represent either a single component or a single subsystem. This direct connection 40 is depicted via a dashed line since it is not a communication link that normally would be included in the electronic system, unlike the communication bus typically would be, for example. In other embodiments, the FDS 16 and the SUM 12 can be connected via the communications bus 18 (or other communication link); however, a direct connection can be added (as shown by the dashed line) since, in some scenarios, there may be some exceptional conditions in which it may be desirable to avoid the latency of the communication bus 18. For example, for certain safety related failures, the message identifying the failure could conceivably be greatly improved through using this direct connection 40 by enabling the system to instantaneously (or, near-instantaneously) send the warning message concerning a component failure. In addition, in at least some embodiments, the direct connection 40 can simplify synchronization of sensor sampling between the supplemental sensors 32 and the existing system sensors, including the SUM sensors 13 and the other system sensors 14. Moreover, in some embodiments, the estimated error can restore system performance; an example of this is a calibration failure in a lidar/radar sensor or other surveillance sensors; such a failure in the senor (when it is used for vehicle steering) can lead to possible accidents in some scenarios.

The SUM 12 can include one or more electronic devices (including electromechanical devices), each of which can be represented using a state variable model. Various state variable model forms can be used and, in one embodiment, the following equation can be used:

$$\dot{x} = Ax + Bu \quad \text{(Equation 1)}$$

where x is an N-dimensional vector that includes the variables involved in modeling the SUM 12 (referred to hereinafter as the "SUM state"), u is the system input that can represent R number of inputs (e.g., u can be an R-dimensional vector), $\dot{x}$ represents the rate of change of the state (or derivative of the state), A is the state transition matrix, and B is the state input matrix. As used herein, "system input" refers to input that is received into the SUM 12, which can include input from other sensors 14 and/or external devices (not shown). The SUM state x can represent the state of the SUM 12 at a given time. And, in at least some embodiments, the state change (or state derivative) $\dot{x}$ can be the derivative of the state vector as taken with respect to time. In at least one embodiment, the state transition matrix A can be a matrix and the state input matrix B can be a matrix (e.g., a vector). In some embodiments, the system input u can be a scalar value.

The output of the SUM 12 can also be modeled (as discussed more below) and represented using a state variable model (or state variable analytical model). For example, the following equation can be used to represent the SUM output y of the SUM 12:

$$y = Cx + Eu \quad \text{(Equation 2)}$$

where y is the SUM output, C is an output matrix, and E is the feedthrough matrix. In one embodiment, the SUM output is an M-dimensional vector and the output matrix C is an M by N matrix. In many scenarios, there may be no direct relationship between the system input u and the SUM output y and, in such cases, E can be equal to zero (0). In one embodiment, the SUM output y can be determined based on measurements of the variables (e.g., those that are modeled as a part of constructing the state transition matrix A) as measured by the system sensors 13, 14 and/or the supplemental sensors 32, which is discussed in more detail below.

In many embodiments, the failing or failed component (e.g., a failing or failed individual component or subsystem) can be identified through obtaining the parameter(s) of the component through estimating the present state transition matrix $A_i$ and/or the present state input matrix $B_i$. Nominal values for the present state transition matrix $A_i$ and/or the present state input matrix $B_i$, which can be represented by nominal state transition matrix $A_S$ and nominal state input matrix $B_S$. The relationship of these variables is given by:

$$A_i = A_S + \Delta A \quad \text{(Equation 3)}$$

$$B_i = B_S + \Delta B \quad \text{(Equation 4)}$$

The nominal values ($A_S$ and $B_S$) can be determined based on specifications from a supplier of the component(s) of the SUM 12, or may be determined through operating the system and taking measurements. As such, in some embodiments, the nominal values can be determined through routine measurements in a laboratory environment. A state variable analytical modeling process is discussed below, in which one example of obtaining the nominal values is described.

The present state transition matrix $A_i$ includes the parameters for the actual model of the SUM 12 and represents the state transition matrix A for the SUM 12 (including any or all of the individual components or subsystems of the SUM 12). Likewise, the present state input matrix $B_i$ includes the parameters for the actual model of the SUM 12 and represents the state input matrix B for the SUM 12 (including any or all of the individual components or subsystems of the SUM 12). The numerical value associated with the performance or functionality of each subject component (of the SUM 12) is a parameter of one or more of these coefficients of $A_i$ and/or $B_i$. Moreover, the parameter values represented by $A_i$ and $B_i$ can change or deviate from the nominal values (as represented by state transition matrix deviation $\Delta A$ and state input matrix deviation $\Delta B$) based on various factors, including environmental factors, wear of the vehicle components, physical damage from erosion or impact, other degradation of the components, etc.

At least in some embodiments, the sensors for measuring the state variables are provided as part of the SUM 12 (e.g., SUM sensors 13). However, for some SUM configurations, the FDS 10 may require supplemental sensors 32 so that all N state variables can be measured. The supplemental sensors 32 can be optional depending on the particular SUM 12 being monitored, as is discussed in more detail below.

In some embodiments, it can be assumed that for the given system, the E matrix is zero and the C matrix in the FDS model is an N-dimensional identity matrix (i.e., all state variables are measured and any random errors are assumed to be negligible). And, in one embodiment, it can further be assumed that the FDM 16 and all associated parts of the FDS 10 are discrete time since the signal processing is performed in a digital system (e.g., microcomputer). In at least some embodiments, suitable analog to digital converters can be included in the FDS or in the system sensors and/or supplemental sensors. The sample times are denoted $t_k$ and are given by:

$$t_k = kT \quad k = 0, 1, 2, \ldots \quad \text{(Equation 5)}$$

where T is the sample period (e.g., with units 1/second). The measurement of all N sensors yields a sampled value of the state vector x(t) at $t_k$:

$$y_k = y(t_k) = I(N)x_k = x_k = x(t_k) \quad \text{(Equation 6)}$$

where I(N) is an N-dimensional identity matrix. The discrete time model for the given system is given by Equation 1 above, which can also be represented by the following equation via substitution using Equations 3 and 4 above:

$$\dot{x}_k = A_i x_k + B_i u_k = A_S x_k + \Delta A\, x_k + B_S u_k + \Delta B u_k,$$
$$\text{where } u_k = u(t_k) \quad \text{(Equation 7)}$$

The sampled state derivative $\dot{x}_k$ can be obtained in several ways depending on the relationship between the sample period T and the rate of change of the most rapidly varying state variable in x. For simplification, it can be assumed that the input is a scalar such that B is an N-dimensional vector. An example (which has been supported via simulation) of an accurate estimate of $\dot{x}_k$ is given by $$\dot{x}_k = \frac{1}{2}\left[\frac{(x_{k+1} - x_k)}{(t_{k+1} - t_k)} + \frac{(x_k - x_{k-1})}{(t_k - t_{k-1})}\right] \quad \text{(Equation 8)}$$

Those skilled in the art will appreciate that other algorithms and/or methods can be used to accurately estimate the sample state derivative $\dot{x}_k$.

Using the illustrative estimation of the sample derivative $\dot{x}_k$ of Equation 8, the discrete time model is given by:

$$\Delta A x_k + \Delta B u_k = \dot{x}_k - A_s x_k - B_s u_k = r_k \qquad \text{(Equation 9)}$$

The right-hand side of this equation denoted $r_k$ (i.e., $r_k = \dot{x}_k - A_s x_k - B_s u_k$) can be calculated from the measurements of $y_k$ using the known nominal matrices $A_s$ and $B_s$. In many embodiments, the variable $r_k$ is an N-dimensional vector that contains the data for estimating $\Delta A$ and $\Delta B$. In many embodiments, this parameter change value $r_k$ can be an N-dimensional vector. As explained in more detail below, this method can be used to compute the state transition matrix deviation ($\Delta A$) and the state input matrix deviation ($\Delta B$) such that a close estimate of $A_i$ and $B_i$ can be determined, which can then be used to obtain particular parameter values for one or more individual parts of the SUM 12. Thus, even if the individual component being monitored is a part of a particular subsystem, the individual component can still be associated with individual component parameters. However, in other embodiments, these particular parameter values can correspond to or be for a subsystem (or a particular subsystem) of the SUM.

The state transition matrix deviation ($\Delta A$) and the state input matrix deviation ($\Delta B$) can each include N number of values or matrices, and may be in the form of a vector. The state transition matrix deviation ($\Delta A$), the state input matrix deviation ($\Delta B$), and the variable $r_k$ can be represented in terms of individual rows.

$$\Delta A = [\Delta A_1, \Delta A_2, \ldots, \Delta A_N]^T \qquad \text{(Equation 10)}$$

$$\Delta B = [\Delta B_1, \Delta B_2, \ldots \Delta B_N]^T \qquad \text{(Equation 11)}$$

$$r_k = [r_k(1), r_k(2), \ldots r_k(N)]^T \qquad \text{(Equation 12)}$$

In this notation, each $\Delta A_m$ can be an N-dimensional row vector and each $\Delta B_m$ can be a scalar (at least when the system input u is a scalar variable):

$$\Delta A_m = [\Delta A_{m1}, \Delta A_{m2}, \Delta A_{m3}, \ldots \Delta A_{mN}] \qquad \text{(Equation 13)}$$

In some embodiments, such as those were $B_i$ is a matrix, $\Delta B_m$ can also be a matrix. However, in the present embodiment in which $\Delta B_m$ is a scalar, a set of N+1 measurements of $y_k$ can be used to make the calculations for a set of N+1 vectors at N+1 successive sample times where the n-th sample of $r_k$ is denoted by $r_n$. The m-th row of $\Delta A$ can be augmented by the m-th row of $\Delta B$, which is denoted by $\Delta Y_m$:

$$\Delta Y_m = [\Delta A_{m1}, \Delta A_{m2}, \Delta A_{m3}, \ldots \Delta A_{mN}, \Delta B_m] \qquad \text{(Equation 14)}$$

where the index m denotes the row of the matrix A and B.

Each measurement vector $X_k$ can also be augmented by the system input $u_k$, which is denoted by $x_{ak}$:

$$x_{ak} = [x_k^T, u_k] \qquad \text{(Equation 15)}$$

A matrix of N+1 vectors defined by $x_{ak}$ is denoted by $X_1$:

$$X_1 = [x_{a1}, x_{a2}, \ldots x_{aN+1}]^T \qquad \text{(Equation 16)}$$

A vector that is denoted R(m) is created by placing the m-th row of each $r_n$ in the following form:

$$R(m) = [r_1(m), r_2(m), \ldots r_{N+1}(m)]^T \qquad \text{(Equation 17)}$$

The estimates of the present state transition matrix $A_i$ and the present state input matrix $B_i$ can be found and/or determined using the following steps:

$$P = [X_1^{-1}[R(1), R(2), \ldots R(N+1)]]^T \qquad \text{(Equation 17)}$$

$$\Delta \hat{A} = \begin{bmatrix} P(1,1), P(1,2) \ldots P(1,N) \\ \vdots \\ P(N,1), P(N,2) \ldots P(N,N) \end{bmatrix} \qquad \text{(Equation 18)}$$

Thus, the present state transition matrix estimate is given by $\hat{A}_i$, which can be determined using the above equations. For a single dimensional input, which has been assumed for the illustrative embodiment presented herein, the estimate of the state input matrix $\hat{B}$ is given by:

$$\Delta \hat{B} = \begin{bmatrix} P(1, N+1) \\ \vdots \\ P(N+1, N+1) \end{bmatrix} \qquad \text{(Equation 19)}$$

Thus, the present state transition matrix estimate $\hat{A}_i$ and the present state input matrix estimate $\hat{B}_i$ are as follows:

$$\hat{A}_i = A_s + \Delta \hat{A} \qquad \text{(Equation 20)}$$

$$\hat{B}_i = B_s + \Delta \hat{B} \qquad \text{(Equation 21)}$$

In many embodiments, for any practically useful FDS model for the SUM 12 that has the component whose failure is to be detected, the matrix coefficients may be required to be known functions of the component parameters that quantitatively represents its performance. Each component (e.g., individual component, subsystem) can have a range of values for the parameter(s) that represent the component's performance that correspond to acceptable levels of performance of the associated system. Whenever the component parameter exceeds this tolerance range, the component can be considered failed or failing, as explained below.

This method of estimating the present state transition matrix estimate $\hat{A}_i$ and the present state input matrix estimate $\hat{B}_i$ has been shown to accurately enable failure detection in various simulations. This method of obtaining the present state transition matrix estimate $\hat{A}_i$ and the present state input matrix estimate $\hat{B}_i$ can enable the FDM 16 to reliably detect failures and estimate time to failure, as explained below. Additionally, the present state transition matrix estimate $\hat{A}_i$ and the present state input matrix estimate $\hat{B}_i$ permits the calculation of the individual component parameters of the SUM 12 and, thus, can be used to obtain these individual component parameter values. Also, in some implementations, the present state transition matrix estimate $\hat{A}_i$ and the present state input matrix estimate $\hat{B}_i$ permits the calculation of the subsystem parameters of the SUM 12 and, thus, can be used to obtain these subsystem component parameter values. In many embodiments, the calculated parameters are the data from which the time to failure (TTF) or time to unacceptable performance of the corresponding component can be accurately estimated.

Using the above parameter estimation process, the FDM 16 can, at least in some embodiments, directly detect and identify a failure from the estimated matrices, such as the present state transition matrix estimate $\hat{A}_i$ and/or the present state input matrix estimate $\hat{B}_i$. Any or all of the individual components or subsystems in the SUM 12 can have parameters that are a part of one or more matrix coefficients of the present state transition matrix estimate $\hat{A}_i$ and/or the present state input matrix estimate $\hat{B}_i$. In some embodiments, it is directly possible to assess the performance of any component in the SUM 12 from the estimated parameter values associated with the individual components or subsystems. Tolerance ranges can also be used and associated with the one or more individual components or subsystems. These tolerance ranges can be as characterized quantitatively by the parameters obtained from the matrix estimates. The tolerance ranges can depend on the particular associated component (i.e., the associated one or more individual components or subsystems), and can be a range of values, a maximum threshold value, or a minimum threshold value. These tolerance ranges can be specified by the OEM of the SUM 12 or the individual components or subsystems thereof, or may be determined through laboratory experimentation. The tolerance ranges also, at least in some embodiments, can be based on nominal values (such as those of the nominal state transition matrix estimate $A_S$ and/or the nominal state input matrix $B_S$).

In addition to the tolerance of component parameters, which can represent a range of normal system performance, there can be other specified limits that demarcate the range of component parameter values of acceptable overall system performance for one or more individual components or subsystems of the SUM 12. In some cases, these acceptable-range limits could refer to safety specifications, such as vehicle safety specifications that can be found for safety related vehicle systems (e.g., automatic steering). Such limits can, at least in some scenarios, readily be determined by experts such as the designer of the system. The FDS can also include, in some embodiments, the capability to accurately estimate the amount of time it will take for the component to reach these limits of acceptable/safe system performance, as discussed more below.

The time to failure (TTF) can be used in the case of a gradual degradation in performance. In the case of a gradual degradation in performance, the parameters associated with the degrading component may be essentially random variables.

In addition to the parts that make-up a given system, the overall performance of certain electronic systems can be strongly influenced by the environment in which the vehicle is operating. For example, in the context of a vehicle electronic system, the performance of an automatic steering system can be, and most of the time is, influenced by the tire/road characteristics. For example, a state variable model for the automatic steering system can include the tire/road cornering stiffness parameters. When the above FDM 16 is applied to an automatic steering system of vehicle electronics, as discussed in more detail below, accurate estimations of the local instantaneous cornering stiffness can be achieved. In some scenarios, a significant reduction in tire cornering stiffness (e.g., due to road ice) can adversely affect the vehicle's automatic steering system capability. Thus, the automatic steering system can experience the equivalent of a failure with total loss of control as a potential consequence, especially where the system is not able to automatically compensate for such a cornering stiffness reduction. The FDM 16, when applied to an automatic steering system of vehicle electronics, can be capable of accurately estimating cornering stiffness that could be used to compensate for a loss of safe steering. The FDS also can closely estimate other vehicle/environment parameters that can potentially contribute to vehicle safety, using the techniques discussed herein. Special Cases. There are certain electronic systems (and, in particular, certain vehicle electronic systems) in which the parameter estimation can be obtained without using the full matrix inversion (i.e., $X_1^{-1}$). For illustrative purposes, a simple example is provided that is for a two-dimensional state variable in a model for which the matrix coefficients A(2,2) and B(2) are zero. For a two-dimensional state vector, the model has two first order differential equations. The first equation expresses the relationship between $\dot{x}_i$ and the two state variables $x_1$, $x_2$. In this case, the matrix coefficient $A_{21}$ is obtained from the second equation in the two-dimensional state variable model as given by:

$$\dot{x}_2(k) = A_{21} X_1(k) \qquad \text{(Equation 22)}$$

In this case $A_{21}$ is obtained from sensor measurements and the $\dot{x}_2$ computation is as follows:

$$A_{21} = \frac{\dot{x}_2(k)}{x_1(k)} \qquad \text{(Equation 23)}$$

The remaining coefficients in this two-state variable example are computed as follows:

$$P[x_1^{-1} R(1)]^T$$

$$\hat{A}_{11} = P_{11} \; \hat{A}_{12} = P_{12}$$

$$A_{22} = 0 \; B_1 = P_{13} \; B_2 = 0 \qquad \text{(Equation 24)}$$

where R(1) is a special case of Equation 17 with N=2. A similar procedure can be followed in special case parameter estimation for three or more state variables.

The component parameter under study by the FDS can often be computed directly from $A_{21}$. This method of estimating a component parameter has been successfully tested in simulation and in laboratory experiments, both of which obtained very close estimations of a component parameter. The individual matrix coefficients are continuously updated by the normal computation of the FDS parameter estimation methodology.

Sensor Time Synchronization. In many scenarios, one of the practical issues affecting the accuracy of the parameter estimation process concerns the synchrony of the sensor values. In some embodiments, it may be desirable that samples of all sensors (and/or the components) in the state vector $x_k$ be synchronous or at least nearly synchronous. In practice, with acceptable limits of the accuracy of the estimates of the state transition matrix $\hat{A}$ and the state input matrix $\hat{B}$ (e.g., within 0.5% of the correct value), the associated variations in component parameter estimates yield the estimates of the tolerance limits on the small variations in synchrony of the $x_k$ components. The details of the tolerance of synchrony are (or, at least can be, in many embodiments) a function of the dynamics of the vehicle electronic system and are determined during the process of analytical modeling.

The synchrony in question is the relative timing of the samples obtained from all of the sensors for a given system FDS application. The FDM 16 (and/or the FDS 10) can be designed such that all supplemental sensors 32 are sampled synchronously. However, when system sensors (including the SUM sensors 13 and/or the other system sensors 14) of the system are also used in the method discussed herein, the sensor values received from the system sensors may not be time synchronized and, thus, at least in some embodiments, there is a need to synchronize timing of the sensor values. Thus, the FDM 16 can be configured to adjust sample times of the system sensors (and, potentially, in some embodiments, the supplemental sensors 32) that are a part of the system (or SUM 12) to the timing used in the parameter estimation. For a given system (or SUM 12), the FDM 16 can provide the timing basis via a highly precise internal clock.

In terms of the timing basis, the sample time associated with the state vector $x_k$ is denoted $t_k$. As an example and for the purpose of explaining the FDS synchronization method, a single sensor associated with a given electronic system can be considered, where that single sensor provides a measurement for one of the state vector parts in $x_k$, which can correspond to an individual component of the SUM 12. For illustrative purposes, the signal from this sensor is denoted S. Under control of the electronic system, samples of the sensor are taken at times $t_m$ in terms of the FDS clock time, which can be provided by a computerized clock that is included in the FDM 16, for example. In a typical exemplary vehicle electronic system, $t_m \neq t_k$—that is, the state vector sample time $t_k$ is not the same as the sensor sample time N. Thus, the sample provided to the FDM 16 should be adjusted such that a signal corresponding to $S(t_k)$ can be obtained.

For the purpose of computing $S(t_k)$ accurately, a set of samples of the sensor can be obtained. This set of sample values from the sensor can include K samples which are denoted $S_1, S_2, S_3 \ldots S_K$, in which $S_m = S(t_m)$ and $t_m \leq t_k$. A polynomial model of the sensor output during the time interval from m=1 to m=K can be placed in a vector denoted $\overline{S}$ by the FDM 16.

$$S=[S_1, S_2, \ldots S_K]^T \quad \text{(Equation 31)}$$

A polynomial model for the sensor during this time interval can be given by:

$$S(t)=b_0+b_1 t+b_2 t^2+ \ldots b_N t^N \quad t_1 \leq t \leq t_N \quad \text{(Equation 32)}$$

The set of sensor samples obtained can be written in matrix form as given by:

$$\overline{S} = M \overline{b}, \text{ where} \quad \text{(Equation 33)}$$

$$\overline{b} = [b_0, b_1, b_2, \ldots b_N]^T \text{ and}$$

$$M = \begin{bmatrix} 1, & t_1, & t_1^2, & \ldots & t_1^N \\ \vdots & \vdots & \vdots & & \vdots \\ 1, & t_K, & t_K^2, & \ldots & t_K^N \end{bmatrix}$$

where K<N The solution for the polynomial coefficients ($b_n$) can be given by:

$$b=(M^T M)^{-1} M^T \overline{S} \quad \text{(Equation 34)}$$

Then a sample of S at the desired time $t_k$ can be given by:

$$S(t_k)=b_0+b_1 t_k+b_2 t_k^2+ \ldots b_N t_k^N \quad \text{(Equation 35)}$$

For the purposes of computing the parameter estimates of the state transition matrix $\hat{A}$ and the state input matrix $\hat{B}$, a set of samples of S at three times $t_{k-1}, t_k, t_{k+1}$ is computed to obtain the sampled state derivative $\dot{x}_k$. The interval from $t_1$ to $t_K$ in which the sensor data is obtained can be established during FDS design (and/or the modeling) by the known dynamic response characteristics of each sensor associated with the given electronic system, such as the SUM 12. For many electromechanical systems (e.g., automatic steering of a vehicle electronics system), the time rate of change in S is sufficiently small such that K can be 2 or 3 and N can be 3 or 4. This practical consideration is confirmed by simulation based on some example models for vehicle electromechanical systems. For the typical case in which the FDS is independently monitoring the system's condition (e.g., the system's health), the FDS can devote a cycle of time to each of its systems that the FDS is monitoring. Data is collected from the sensors during the cycle for a given system. This data can be collected from the supplemental sensors 32, the other system sensors 14, and/or the SUM sensors 13.

In the context of a vehicle electronic system, the cycle repetition rate for each vehicle electronic system can be chosen in accordance with important issues such as vehicle safety. Although each individual vehicle OEM which incorporates the FDS may have the ability to choose individual system cycle rates, safety related systems can have a relatively high cycle rate (e.g., automatic steering or braking) and those associated with comfort or entertainment systems may have a lower cycle rate.

Component Failure/Degradation Analysis. The failure detection and/or identification based on the parameter estimation method discussed herein can be dependent on the relationship of the coefficients of the present state transition matrix estimate $\hat{A}_i$ and the present state input matrix estimate $\hat{B}_i$ and the parameters that are associated with individual components or subsystems in the SUM 12. The development of the linear dynamic equation in the form of the state variable model involves parameters that quantitatively express the performance of each individual component or subsystem of the SUM 12. The set of parameters (in some embodiments, only single parameter) appear in the matrix coefficients of the state transition matrix A and/or the state input matrix B. Once these matrices of the state variable model for the system are estimated by the parameter estimation methodology (discussed above), the component parameters of the set, which are each associated with either an individual component or subsystem, are computed in the FDS.

The one or more parameters for each individual component or subsystem ("component parameter") of the SUM 12 can be associated with a parameter tolerance range. This parameter tolerance range (or tolerance range) corresponds to the set of values for the parameter that represents desired SUM and/or component performance. Whenever the component parameter is outside of the parameter tolerance range, the associated individual component or subsystem is possibly undergoing degradation and the FDS can maintain a record of the parameter values over time, which can be performed through storing the parameter values and/or other information in memory of the FDM 16. The parameter variations of an individual component or subsystem which is undergoing degradation may typically (though not necessarily) be in the form of a random variable. In the case of a random variable, the FDS can conduct a statistical study of the one or more parameters involved. Moreover, a separate range of values for p can be used to detect a complete failure of the SUM 12 (or individual component or subsystem), and can be referred to as a complete failure range.

For the purpose of conducting a statistical analysis on a component undergoing degradation and which can yield an estimate of the time to failure (unacceptable or unsafe performance), it can be convenient to define a random variable which characterizes quantitatively the degradation. For illustrative purposes, a single parameter that is denoted p is considered. The measure of degradation that is termed the degradation index and denoted d is given by:

$$d=p_{nom}-p \quad \text{(Equation 36)}$$

where $p_{nom}$ is the desirable nominal value for p. Depending on the particular component, degradation can correspond to either an increase or a decrease in p relative to $p_{nom}$. For illustrative purposes, the parameter tolerance range for p is given by the following:

$$p_l \leq p \leq p_u \quad \text{(Equation 37)}$$

where $p_u$ is an upper bound and $p_l$ is a lower bound of the parameter tolerance range.

Whenever p is outside of the parameter tolerance range ($p<p_l$ or $p>p_u$), the FDM 16 can continue to collect samples in time of the parameter value. These samples are denoted $p_k$ which are define as follows $$p_k=p(t_k) \quad \text{(Equation 38)}$$

where $t_k$ is the time of the sample $p_k$. For convenience in explaining FDS tracking of gradual degradation, it is assumed that sampling is periodic, although this is not necessary at least in some embodiments. For periodic sampling $t_k$ is given by:

$$t_k=k\,T_S,\ k=1,2,3\ldots \quad \text{(Equation 39)}$$

where $T_S$ is the sample period (represented in time units).

The sampling and the storing of the samples in memory can be carried out to permit the FDM 16 to predict the time to failure (TTF), which can correspond to the time that it will take for the component to degrade to a level that corresponds to unacceptable (possibly unsafe) operation of the electronic system. This level of degradation is denoted $d_f$. Assuming that degradation is sufficiently slow or at least not instantaneous, the time for d to reach $d_f$ (which is denoted $T_F$) can be estimated using a regression analysis. A predicted $T_F$ (or TTF) before $d_f$ is reached by the component can allow the FDM 16 to alert the vehicle operator of the possible failure such that repairs can be made before a failure occurs or so that other remedial and/or mitigating actions can be taken. The FDM 16 can use the user interface 28 to notify an operator or other user of the failure (or potential failure). The time to failure can also be included in the notification. In other embodiments, an electronic notification can be generated and sent to another device or system via the communication bus interface 26 and/or the wireless communications interface 30. This type of warning can enhance the system's reliability and, in some embodiments, can increase operator and/or user safety of the system.

As mentioned above, regression analysis of random variables can be used, in conjunction with the parameter analysis, to estimate the time to failure (TTF), which can be represented by a TTF value ($T_F$). In many scenarios, the degradation index for the degrading component parameter is a random variable. The random elements of d can result from process noise in the FDS sensor measurements and from a random fluctuation in the component degradation. The FDS can use regression analysis to construct a polynomial model for the degradation as a function of time.

For illustrative purposes, the model for the time dependent degradation (d(t)) is assumed to be a Kth degree polynomial of the form:

$$d(t)=a_0+a_1 t+a_2 t^2+\ldots a_K t^K \quad \text{(Equation 40)}$$

The coefficients of the polynomial ($a_m$, m=0, 1, 2 ... K) are computed using an ordinary least squares method derived from a set of N samples where N>>K. In other embodiments, other regression techniques can be used. In matrix notation, this data can be expressed as follows $$\bar{d}=M\bar{a} \quad \text{(Equation 41)}$$

where $$\bar{d}=[d(t_1), d(t_2) \ldots d(t_N)]^T$$

$$\bar{a}=[a_0, a_1 \ldots a_K]^T$$

$$M=\begin{bmatrix} 1 & t_1 & t_1^2 & \ldots & t_1^K \\ 1 & t_2 & t_1^2 & \ldots & t_2^K \\ \vdots & \vdots & \vdots & \ldots & \vdots \\ 1 & t_N & t_N^2 & \ldots & t_N^K \end{bmatrix}$$

A desired estimate of the vector of coefficients of the model are found from the pseudo-inverse of matrix M:

$$\hat{a}=(M^TM)^{-1}M^T\bar{d}=\text{estimate of }\bar{a} \quad \text{(Equation 42)}$$

The time to failure for the component $T_F$ is found by solving the following equation:

$$d_f=\hat{a}_0+\hat{a}_1 T_F+\hat{a}_2 T_F^2 \ldots \hat{a}_K T_F^K \quad \text{(Equation 43)}$$

The FDM 16 obtains the K roots to this equation using a standard analytical procedure. A simple set of rules are used to select the correct estimate of $T_F$ denoted $\hat{T}_F$ including, for example: (1) $\hat{T}_F>T_N$, (2) $\text{Im}(\hat{T}_F)=0$, etc. In many electronic system components, the degree of the degradation polynomial K is 1, 2 or 3; however, this value K can vary and, in other embodiments, can be higher.

In some embodiments, regardless of the details in estimating $T_F$, when the degradation is gradual, the estimate of $T_F$ should be sufficient for the FDS to issue a proper notification and/or warning. This notification and/or warning can be sent to an OEM (or another monitoring station) via the wireless communications interface 30, or it can be sent to other components of the system, such as those that are connected to the communications bus 18 and/or that are connected to the wireless communications interface 30.

On the other hand, a sudden complete failure or an intermittent failure (a "current failure") can also be detected as it occurs. For example, when using the FDS 10 in the context of a vehicle electronics system, the FDS can supply the warning (indicating that the failure has occurred) to the vehicle control system (for a level 5 autonomous vehicle) or to the driver (for a level 4 or below vehicle) as well as to monitoring stations at the OEM. In one embodiment, for the level 5 autonomous vehicle, the warning of a failure can be used to cause the vehicle control system to switch to a redundant back-up component (where available) and, for vehicles with drivers (e.g., level 4 and below), the warning can command the driver to take manual control. The warning message sent to a monitoring station (e.g., OEM) can be used for a variety of purposes including a recommendation for repairs if the failure is not catastrophic for the vehicle, for example.

This parameter estimation method of detecting and/or identifying failed and/or failing components also can be used to make a failure detection application that is based on a failure detection filter (FDF). The construction and use of failure detection filters are well-known to those skilled in the art, and can be used in conjunction with the parameter estimation process discussed above. When constructing this FDF-based failure detection application, the model parameters should be accurately known. For certain dynamic systems, these parameters may be constant (or nearly constant) and are therefore available for use in an FDF-based failure detection application. However, for many vehicle electronic systems, the parameters change with vehicle operating conditions or with the environment. The parameter estimation process discussed above may, in some embodiments, continuously upgrade the matrix parameters used in the FDF models. For example, in an automatic steering system, the tire cornering stiffness coefficients may change, as well as the vehicle speed. However, the parameter estimation failure detection and identification can be implemented to perform the tasks without using a separate, dedicated FDF module. Rather, the failure detection application can be compiled into a pre-existing system module of the electronic system, such as within an onboard vehicle module (OVM) of a vehicle. Furthermore, the FDF-based failure detection application may, in some embodiments, be primarily useful for detecting actuator failures. However, there can be a variety of systems and/or components for which the FDF-based failure detection application, in conjunction with the parameter estimation process, is desirable.

State Variable Analytical Modeling. The analytical modeling procedures for the development of the state vector model for a given vehicle electronic system are illustrated with an example system. The exemplary vehicle electronic system is an automatic steering system for a vehicle. The present example is not based on any particular OEM automatic steering system. However, this example, which for illustrative purposes is slightly simplified, is a hypothetical system that could function in a real vehicle and has shown excellent performance in simulation. The details of modeling vary somewhat with the type of electronic system and its configuration. However, the present example covers a sufficiently complex system such that the exemplary modeling process discussed below covers many steps that are used for many vehicle electronic systems.

In one embodiment, the state variable analytical modeling can be used to generate the state variable matrices for the parameter estimation process. These state variable matrices that can be generated can include the nominal state transition matrix $A_S$, as well as the nominal input matrix $B_S$. Those matrices provide nominal reference matrices with coefficients based upon design parameters for the SUM 12 (or other electronic system which is intended to be monitored by the FDM 16). In addition, the nominal matrices $A_S$ and $B_S$ provide the structure of the model which is uniquely related to the various state vector variables. In many embodiments, the modeling for the FDS can and, sometimes, preferably should, be based upon any documentation for the electronic system design and functional operation. The modeling data can be obtained from the OEM of the component(s) and then used in the modeling process. However, in some embodiments, it may be possible to obtain modeling data independently with suitable laboratory studies using detailed measurements.

The procedure for developing the state variable analytical model for the example automatic steering system begins with the development of a block diagram in which all subsystems and/or individual components are presented. In other embodiments, all subsystems and/or individual components (collectively, "components") may not be necessary and, additionally or alternatively, only the parts that influence the components and/or subsystems being modeled may need to be obtained.

Figure 2:
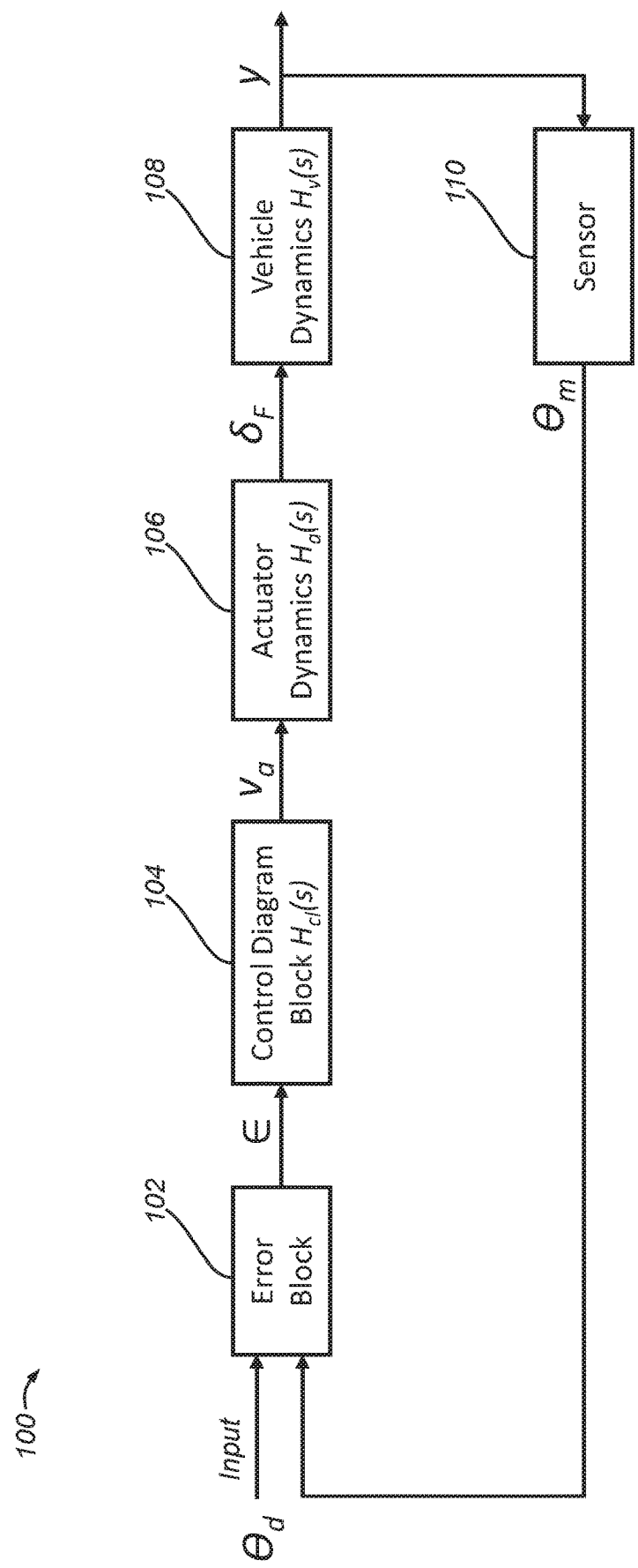
FIG. 2 is a block diagram representing an exemplary automatic steering system as represented in a closed loop control system.

With reference to FIG. 2, there is shown a block diagram representing the hypothetical automatic steering system 100 as represented in a closed loop control system. The individual elements of the FIG. 2 diagram are: 102, the error block that obtains the quantitative error between the command input $\theta_d$ and the measure value $\theta_m$ of this variable; 104, the electronic control system that generates the electrical signal $V_a$ which operates the system actuator; 106, the dynamic model for the actuator; 108, vehicle dynamics with transfer function $H_v(s)$; 110, the sensor that measures the vehicle variable that is being controlled (in this example, the vehicle heading). In this scenario, it is assumed that the input to the automatic control is the desired vehicle heading $\theta_d$. This input is assumed to be generated by the vehicle control system to accomplish navigation of the vehicle along the intended path.

The individual components and/or subsystems depicted in the block diagram are characterized by operational transfer functions of the complex frequency variable s. In some scenarios, this exemplary block diagram is an example of those that would be used by the system designer since design and analysis of a closed loop control system are based upon transfer function models, at least in many instances. In at least one embodiment, the dynamic performance and system stability design procedures are strictly based upon models of this form rather than time dependent models. The components of this block diagram include the following transfer function models:

$$H_{cl}(s) = \frac{v_a(s)}{\in (s)} \qquad \text{(Equation 44)}$$

where $v_a$ is the electrical signal input to the actuator.

$$\in = \text{error} = \theta_d - \theta_m \qquad \text{(Equation 45)}$$

Here, $\theta_m$ is the vehicle heading as measured by a sensor of the SUM and where $\theta_m = K_s \theta$. $K_s$ is the heading sensor calibration constant and $\theta$ is the actual vehicle heading. Assuming for convenience a proportional-integral (PI) control strategy with $K_P$ is equal to the proportional gain and $K_I$ is equal to the integral gain, then $$H_{cl}(s) = K_P + \frac{K_I}{s} \qquad \text{(Equation 46)}$$

$$s\, v_a(s) = (K_P s + K_I)(\theta_d(s) - \theta_m(s)) \qquad \text{(Equation 47)}$$

The time domain model is given by:

$$\dot{v}_a = K_P(\dot{\theta}_d - \dot{\theta}_m) + K_I(\theta_d - \theta_m) \qquad \text{(Equation 48)}$$

For the actuator, a typical first order model can be used:

$$H_a(s) = \frac{\delta_F(s)}{v_a(s)} = \frac{K_{st}}{\tau_F s + 1} \qquad \text{(Equation 49)}$$

where $K_{st}$ is the actuator calibration constant and $\tau_F$ is the time constant. In one example, the time constant $\tau_F$ can be approximately 0.1 seconds. The time domain equivalent can be given by:

$$\dot{\delta}_F = -\frac{\delta_F}{\tau_F} + \frac{K_{st} v_a}{\tau_F} \qquad \text{(Equation 50)}$$

The vehicle dynamics or "Plant" transfer function.

$$H_v(s) = \frac{\theta(s)}{\delta_F(s)} \qquad \text{(Equation 51)}$$

The transfer function from the state variable model for the vehicle dynamics is given by:

$$\dot{x}_v = A_v x_v + B_v \delta_F \quad \text{(Equation 52)}$$

$$y_v = C x_v + E \delta_F \quad \text{(Equation 53)}$$

where $A_v$ and $B_v$ are matrices for the vehicle dynamics only, at least in this embodiment. In many scenarios, E can be zero as mentioned above. And, assuming that E is zero for this example (e.g., see Equation 52), then:

$$(sI - A_v)x_v(s) = B_v \delta_F(s) \quad \text{(Equation 54)}$$

$$y_v(s) = Cx_v(s) = C(sI - A_v)^{-1} B_v \delta_F(s) \quad \text{(Equation 55)}$$

where I is the identity matrix and C is chosen such that $y_v = \theta$, where $Cx_v = \theta$.

$$\frac{\theta(s)}{\delta_F(s)} = C(sI - A_v)^{-1} B_v \quad \text{(Equation 56)}$$

In many instances, the conversion from vehicle dynamic state vector equation to transfer function is required to design the control system for stable closed loop operation and can include: root-locus techniques, gain and phase margin analysis techniques, Bode plot frequency response techniques, and others known to those skilled in the art. These techniques using $H_v(s)$ are not part of FDS modeling but are used during the automatic steering control design. Moreover, the state variable equations are incorporated directly in FDS modeling and the coefficients of $A_v$ and $B_v$ can thus be included in $A_S$ and $B_S$. However, at least in some embodiments, the state vector has a larger dimension in the failure detection system than the vehicle dynamics dimensionality used in the closed loop design. Equations leading to vehicle dynamics are can be standard and, in at least this example, are taken to be the linear dynamic model with negligible roll dynamics. Some examples of equations can be found in "Tire and Vehicle Dynamics" written by Hans Pacejka and published by Elsevier under the imprint Butterworth-Heinemann.

The linear simplified dynamic equations for the lateral vehicle motion for use in this example can be given by:

$$m\dot{v} = \frac{-2(C_F + C_R)}{u_0} v - [mu_0 + 2(aC_F - bC_R)]r + 2C_F \delta_F \quad \text{(Equation 57)}$$

$$I_{ZZ}\dot{r} = \frac{-2(aC_F - bC_R)}{u_0} v - 2\left(\frac{a^2 C_F + b^2 C_R}{u_0}\right) \quad \text{(Equation 58)}$$

where v is the lateral velocity of the vehicle in earth centered, earth fixed (ECEF), r is the yaw rate (which is equal to $\dot{\theta}$), $u_0$ is equal to the longitudinal velocity, $C_F$ is the front tire cornering stiffness, $C_R$ is the rear tire cornering stiffness, m is the vehicle mass, a is the distance from the center of gravity (of the vehicle) to a line through the front wheel pivots, b is the distance from the center of gravity (of the vehicle) to a line through the rear wheel pivots, $I_{ZZ}$ is the moment of inertia about the vertical axis through the center of gravity of the vehicle, and $\delta_F$ is the front wheel steering angle. In this example, the state vector for the vehicle dynamics model can be $x_v = [v, r]^T$. This example assumes there is lateral symmetry along a roll axis of the vehicle.

Thus, combining the above time domain equations into a state variable equation yields a model of the following structure using the nominal values for the component parameters.

$$\dot{x} = A_s x + B_s u \quad \text{(Equation 59)}$$

where
$x = [v, r, \delta_F, v_a, \theta]^T$, $u = [\theta_d, \dot{\theta}_d]$, $y = Cx = \theta$ In this example, the matrices can be given as follows:

$$A_S = \begin{bmatrix} -2\frac{(C_F + C_R)}{mu_0} & -\left[u_0 + 2\frac{(aC_F - bC_R)}{mu_0}\right] & \frac{2C_F}{m} & 0 & 0 \\ -2\frac{(aC_F - bC_R)}{I_{ZZ}u_0} & -2\frac{(a^2 C_F + b^2 C_R)}{I_{ZZ}u_0} & \frac{2aC_F}{I_{ZZ}} & 0 & 0 \\ 0 & & -K_p K_s & 0 & 0 & -K_I K_s \\ 0 & & 1 & 0 & 0 & 0 \end{bmatrix}$$

$$B_S = \begin{bmatrix} 0 & 0 \\ 0 & 0 \\ 0 & 0 \\ K_I & K_p \\ 0 & 0 \end{bmatrix} \text{ and } C = [0, 0, 0, 0, 1]$$

For the purposes of using this model to test the failure detection system, the control was designed for stable operation using root-locus techniques. For example, using $K_P = 2$ and $K_I = 1$ provides good, stable performance in this scenario. The gain and phase margin can be used to guarantee stability for all simulations. This automatic control system was tested via simulation which demonstrated that the vehicle heading tracked the command heading.

The normal sensor calibration constant for this model is $K_s = 1.000$. A simulation of the FDS operation was run with errors in the sensor calibration of 10% at 30 kilometers/hour (i.e., $K_s = 9.000$). In 15 seconds, the vehicle had deviated more than 40 meters from the intended path. The C matrix for the FDS is a 5-dimensional identity matrix for this example. Parameter estimation for the simulated $K_s = 0.9$ was estimated to be $\hat{K}_s = 0.9000$. A warning or notification can be sent, such as to an operator, a remote facility, or other user of the system. And, in some embodiments, sufficient accuracy can be achieved such that a correction can be sent to $\theta_m$ in the control loop thereby maintaining the course for the vehicle. The simulation also yielded the following other estimates: a=1.2 meters; â=1.2016 meters; b=1.65 meters; $\hat{b}$=1.6491 meters; m=1,800 kilograms; $\hat{m}$=1,802 kilograms; $I_{ZZ}$=3,564; $\hat{I}_{ZZ}$=3,590. The accuracy of the estimate of the sensor calibration demonstrates the potential of the FDS 10 (and/or FDM 16) for detecting and/or identifying a failure or degradation in performance of a component. In many scenarios, this accuracy may enhance vehicle safety and/or reliability.

Figure 3:
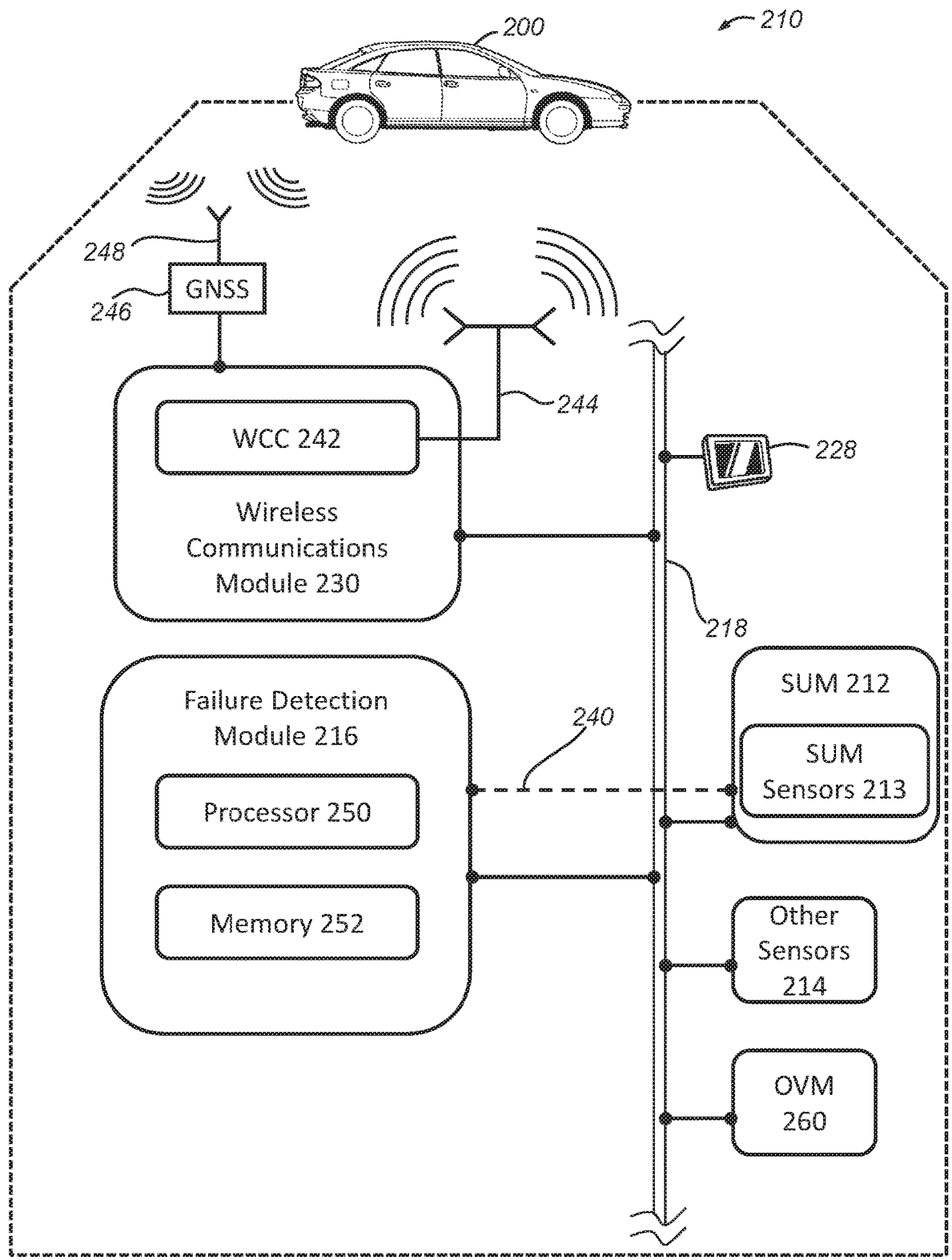
FIG. 3 depicts a communications system that includes a vehicle with vehicle electronics, where the vehicle electronics include a failure detection module.

Although the particular embodiments discussed below are primarily directed to vehicle electronic systems, other (non-vehicular) embodiments can incorporate the failure detection system (FDS) or various parts thereof, as illustrated with a single exemplary SUM. For vehicular applications, the FDS 10 and/or FDM 16 can be used for numerous onboard vehicle modules (OVMs) within a single vehicle electronics environment. FIG. 3 provides one such example in the context of vehicle electronics of a vehicle. For example, all vehicle electronic systems can have an interaction or connection with the failure detection module (FDM) as represented by the SUM 212 of FIG. 3.

With reference to FIG. 3, there is shown a failure detection system (FDS) 210 that is installed as a part of vehicle electronics of a vehicle 200. Vehicle 200 is depicted in the illustrated embodiment as a passenger car, but it should be appreciated that any other vehicle including motorcycles, trucks, sports utility vehicles (SUVs), recreational vehicles (RVs), bicycles, other vehicles or mobility devices that can be used on a roadway or sidewalk, etc., can also be used. As depicted in the illustrated embodiment, the vehicle 200 includes a system under monitoring (SUM) 212, other system sensors 214, failure detection module 216, an in-vehicle network (IVN) (e.g., communications bus) 218, a user interface 228, a wireless communications module 230, a global navigation satellite system (GNSS) receiver or module 246, and other onboard vehicle modules (OVM) 260.

The system under monitoring (SUM) 212 can be analogous to the SUM 12 (FIG. 1) discussed above, except that the SUM 212 is an onboard vehicle module (OVM) that can be used to provide functionality to the vehicle. The OVMs 260 and/or the SUM 212 can include one or more individual component(s) and/or subsystem(s), and some examples include: a body control module (BCM), a powertrain control module (PCM), a power steering module, an automatic steering module, a GNSS receiver, a braking subsystem and/or module, an internal combustion engine (ICE), other primary mover (e.g., electric drive motor), an infotainment unit or other entertainment model, a central onboard computer, a radar/lidar system, other imaging system, other electronic control units (ECUs), etc. In one embodiment, the SUM 212 can be an automatic steering system as discussed above. And, in some embodiments, the SUM 212 can include a processor and memory, which can include any and/or all of the features of the processor 250 and memory 252 of the failure detection module 216, as discussed below. Moreover, as mentioned above with respect to the SUM 12 (FIG. 1), the SUM 212 can include one or more SUM sensors 213.

These SUM sensors 213 can be system sensors. For example, a position sensor can be coupled to an actuator that is a part of the SUM 212. The other system sensors 214 can be analogous to other system sensors 14 (FIG. 1) discussed above. In some embodiments, these system sensors 213, 214 can be used by the failure detection module 216, such as for use in the parameter estimation process discussed below.

The failure detection module (FDM) 216 is analogous to that of the failure detection module (FDM) 16 (FIG. 1) discussed above. However, the FDM 216 does not include failure simulation electronics (such as those failure simulation electronics 24 of the FDM 16) and, thus, the FDM 216 represents the FDS 210 and FDM 216 as incorporated into a production vehicle. In the illustrative embodiment, the failure detection module 216 is shown as including a processor 250 and memory 252. The processor 250 can be any of a variety of devices capable of processing electronic instructions, including microprocessors, microcontrollers, host processors, vehicle communication processors, and application specific integrated circuits (ASICs). The processor 250 can be a dedicated processor used only for the failure detection module 216, or may be shared with other systems and/or may be implemented using existing on-board vehicle digital computational system. The processor can execute various types of digitally-stored instructions, such as software or firmware. The memory 252 can be any of a variety of electronic memory devices that can store computer instructions and/or other electronic information, such as a powered temporary memory, or any suitable non-transitory, computer-readable medium. Such examples can include different types of RAM (random-access memory, including various types of dynamic RAM (DRAM) and static RAM (SRAM)), ROM (read-only memory), solid-state drives (SSDs) (including other solid-state storage such as solid state hybrid drives (SSHDs)), hard disk drives (HDDs), magnetic or optical disc drives, or other device that stores some or all of the software needed to carry out the various device functions discussed herein. In some embodiments, the failure detection module 216 can be implemented as an OEM-installed (embedded) or aftermarket device that is installed in the vehicle.

The wireless communications module 230 can be used to communicate data via short-range wireless communications (SRWC) and/or via cellular network communications through use of wireless communication circuitry (WCC) 242, as depicted in the illustrated embodiment. In the illustrated embodiment, wireless communications module 230 includes a WCC 242, an antenna 244, and a GNSS receiver 246, which includes a GNSS antenna 248. In one embodiment, the wireless communications module 30 may be a standalone module or, in other embodiments, the wireless communications module 30 may be incorporated or included as a part of one or more other vehicle system modules, such as a center stack module (CSM), body control module (BCM) an infotainment module, a head unit, the failure detection module 216, and/or a gateway module. In some embodiments, the wireless communications module 230 can be implemented as an OEM-installed (embedded) or aftermarket device that is installed in the vehicle. And, in at least one embodiment, the wireless communications module 30 is a telematics unit (or telematics control unit) that is capable of carrying out cellular communications using one or more cellular carrier systems (not shown). For example, the wireless communications module 230, in essence, can constitute a vehicle to infrastructure (V2I) communication system.

In some embodiments, the wireless communications module 230 can be configured to communicate wirelessly using one or more short-range wireless communications (SRWC) protocols, such as any of the Wi-Fi™, Wi-Fi Direct™, other IEEE 802.11 protocols, ZigBee™, Bluetooth™ (including any of the Bluetooth™ protocols, such as Bluetooth™ Low Energy), or near field communication (NFC). In such an embodiment, the WCC 242 can be a short-range wireless communication (SRWC) circuit that enables the wireless communications module 230 to transmit and receive SRWC signals, such as Bluetooth signals. The SRWC circuit may allow the module 230 to connect to another SRWC device. Additionally, in some embodiments, the wireless communications module 230 may contain a cellular chipset that may be a part of the WCC 242 also, or that may be separate WCC (or cellular chipset). Thus, in such embodiments, the wireless communications module enables the vehicle 200 to communicate via one or more cellular protocols, such as those used by various cellular carrier systems.

Wireless communications module 230 may enable vehicle 200 to be in communication with one or more remote networks via TCP/IP or other packet-switched data communication. Packet-switched data communications may also be carried out via use of a cellular network that may be accessible by the wireless communications module 230. The wireless communications module 230 may, via WCC 242, communicate data over various wireless carrier systems, including cellular carrier networks. In such an embodiment, radio transmissions may be used to establish a communications channel, such as a voice channel and/or a data channel, with a wireless carrier system so that voice and/or data transmissions can be sent and received over the channel. Data can be sent either via a data connection, such as via packet data transmission over a data channel, or via a voice channel using techniques known in the art. For combined services that involve both voice communication and data communication, the system can utilize a single call over a voice channel and switch as needed between voice and data transmission over the voice channel, and this can be done using techniques known to those skilled in the art.

The GNSS receiver 246 includes an antenna 248 that enables the receiver 246 to receive GNSS radio signals from GNSS satellites (not shown). GNSS receiver 246 may be any suitable commercially available GNSS receiver and may receive GNSS information, which may then be sent over the IVN 218 to other vehicle modules. In one embodiment, the vehicle 200 can use the GNSS receiver 246 to receive GNSS signals to obtain an accurate time. This time can be used to keep the vehicle's internal clock(s) synchronized, such as those that may be included in the failure detection module 216.

The user interface 228 is depicted as a visual display in the illustrated embodiment; however, the user interface 228 can include various device-user interfaces that are capable of communicating information from the vehicle electronics 202 to a user or operator of the vehicle. Non-limiting examples can include an audio speaker, a visual display, a computer monitor, a television, a tactile actuator or other tactile/haptic mechanism, lights (e.g., LEDs), and/or various other device-user interfaces. Any of these device-user interfaces can be used to provide the notification or warnings discussed herein. In addition, the user interface can be designed to have user inputs to the system using standard touch screen technology.

Figure 4:
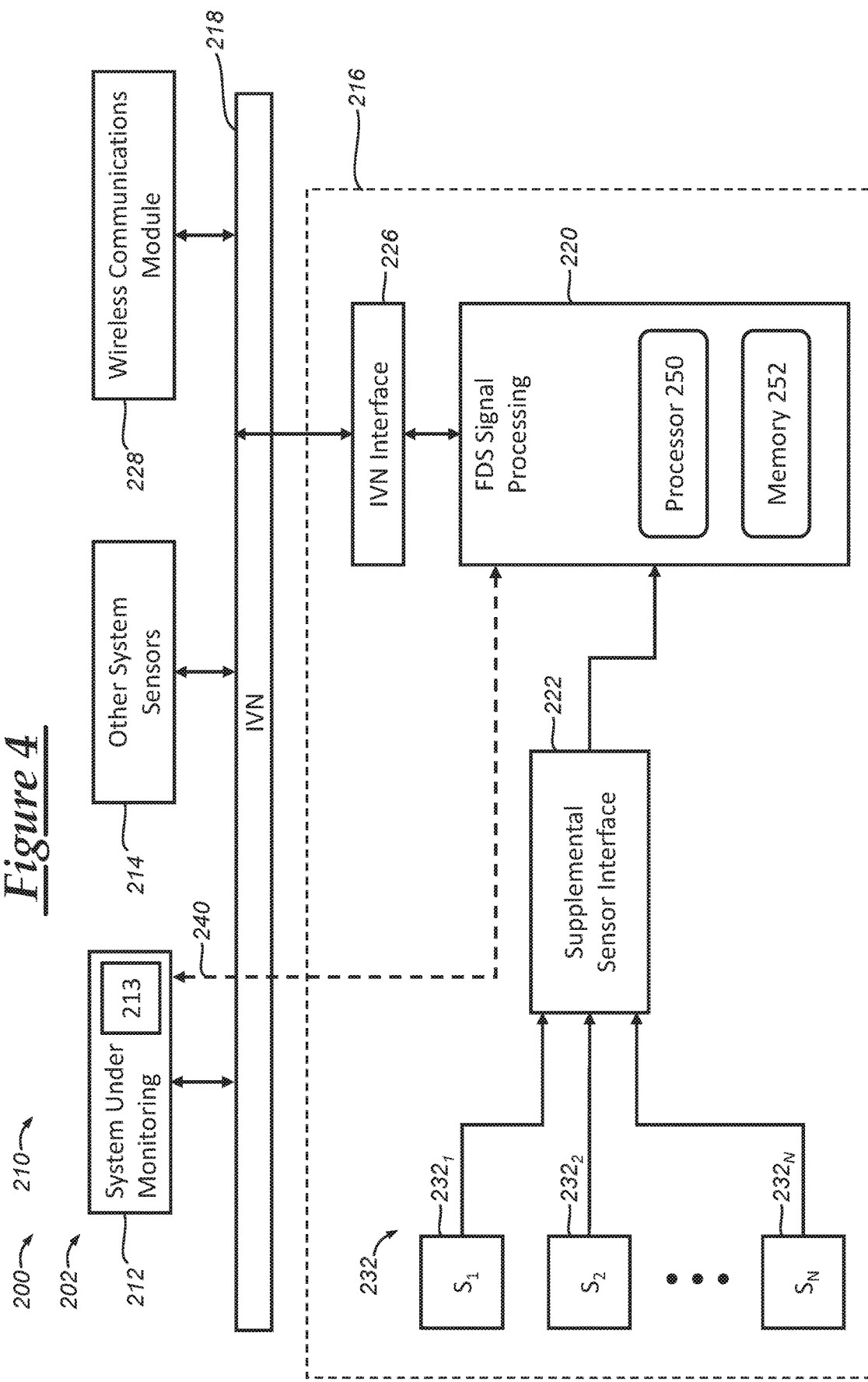
FIG. 4 is a block diagram of an embodiment of a failure detection system as incorporated into vehicle electronics of a vehicle.

With reference to FIG. 4, there is shown vehicle electronics 202, including the SUM 212, the SUM sensors 213, other system sensors 214, the failure detection module 216, the in-vehicle network (IVN) (e.g., communications bus) 218, and the wireless communications module 230. This vehicle FDS 210 is similar to that of the FDS 10 (FIG. 1) discussed above. In this embodiment, however, the wireless communication module 228 is connected to the IVN (or bus) 218 directly and can communicate with the failure detection module 216 via the IVN 218.

The in-vehicle network (IVN) 218 can be used to connect some or all of the different vehicle electronics for communication with each other. The IVN 218 can include one or more communication busses. The IVN 218 provides the vehicle electronics with network connections using one or more network protocols. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, for example.

Figure 5:
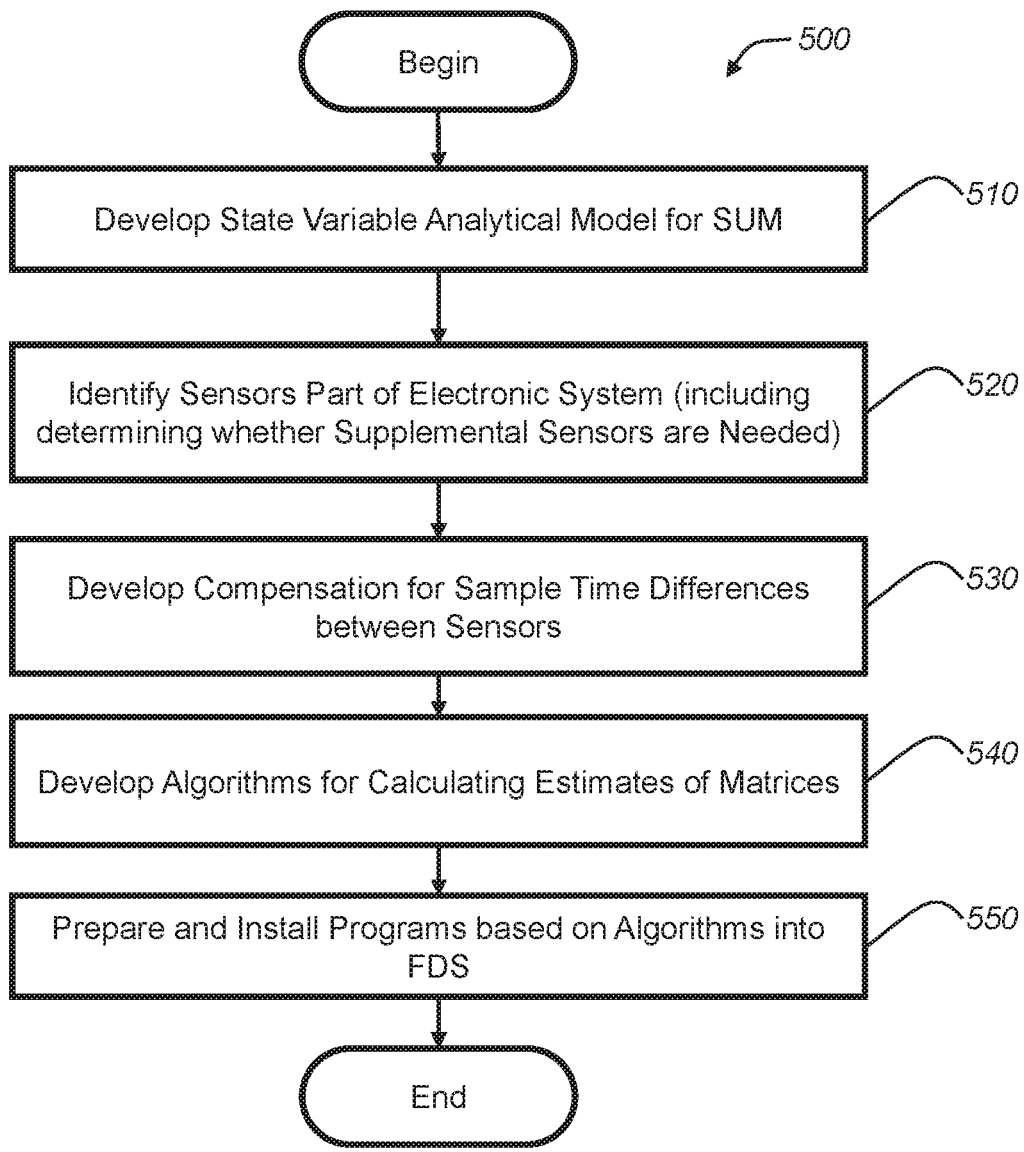
FIG. 5 is a flowchart of an embodiment of a method of modeling an electronic system so that configuration details for a failure detection module can be generated.

With reference to FIG. 5, there is shown a method 500 of modeling an electronic system so that configuration details for a failure detection module can be generated. The method 500 begins with step 510, wherein a state variable analytical model is developed. This step 510 can use the modeling process discussed above, for example. Other modeling techniques can also be used, as will be appreciated by those skilled in the art. In one embodiment, the model can be developed such that it contains the functional relationships between the matrix coefficients (for matrices $A_S$ and $B_S$, for example) and component parameters of the SUM 12, 212. These parameters can be used when quantifying the degradation in the SUM's performance.

In step 520, sensors that are a part of the vehicle electronic system that can measure some or all of the variables in the state vector of the developed state variable analytical model can be identified. In many embodiments, in step 520, all of the system sensors needed to determine (or otherwise obtain) measurements for use in the state variable analytical model can be identified. This can include either or both of the SUM sensors 13, 213 and/or the other system sensors 14, 214. Then, supplemental sensors 32, 232 can be identified, at least in embodiments where additional sensors are needed to measure variables for use in the state variable analytical model. These supplemental sensors 32, 232 can be directly connected and/or integrated into the failure detection module (e.g., FDM 16, failure detection module 216). The supplemental sensors 32, 232 can then be connected to the FDM 16, 216 via a direct, wired connection, or may be connected via a communications bus. However, in many embodiments, a direct, wired connection can be included in the vehicle and used for data communications between the SUM 12, 212 (and/or the SUM sensors 13, 213) and the FDM 16, 216 so as to reduce latency of sensor signal transmissions from the supplemental sensors 32, 232 to the processor and/or other part of the FDM 16 and/or the failure detection module 216.

In step 530, compensation for sample time differences between existing and supplemental sensors is developed. This can include any and/or all of the steps discussed above with respect to the sensor time synchronization process. Also, although the sensor time synchronization process discussed above describes a particular embodiment, other methods for synchronizing the sample times of the various sensor can be used. In one embodiment, the supplemental sensors 32, 232 that are included with the FDM 16 or failure detection module 216 can be time synchronized with one another. In such a case, the time synchronization process can include using the time synchronizing process to obtain adjusted sensor values of the system sensors so that the adjusted sensor values of the system sensors are synchronized with the supplemental sensors with respect to sample time. This can include time synchronizing the other system sensors 14, 214, as well as any of the SUM sensors 13, 213.

In step 540, algorithms and/or equations can be developed for use in calculating the estimates of the matrices for the particular SUM. These algorithms and/or equations can be those used in the parameter estimation process and used to calculate the present state transition matrix estimate $\hat{A}_i$ and/or the present state input matrix estimate $\hat{B}_i$. The estimates of parameter values that are contained in the present state transition matrix estimate $\hat{A}_i$ and/or the present state input matrix estimate $\hat{B}_i$ can then be obtained.

In step 550, one or more computer programs or applications can be developed based on the developed algorithms. The algorithms developed in step 540 can be used to configure computer instructions that can then be compiled into a computer program or application. And, in some embodiments, the algorithms developed in step 540 can be simplified and/or manipulated when being compiled or converted into computer instructions. In one embodiment, the method 600 (discussed below), the parameter estimation process, the time synchronization process, and/or the time to failure estimation process, and/or parts thereof can be implemented in one or more computer programs (or "applications", or "scripts") embodied in a computer readable medium and including instructions usable (e.g., executable) by one or more processors of the one or more computers of one or more systems. The computer program(s) may include one or more software programs comprised of program instructions in source code, object code, executable code, or other formats. In one embodiment, any one or more of the computer program(s) can include one or more firmware programs and/or hardware description language (HDL) files.

Furthermore, the computer program(s) can each be associated with any program related data and, in some embodiments, the computer program(s) can be packaged with the program related data. The program related data may include data structures, look-up tables, configuration files, certificates, or other relevant data represented in any other suitable format. The program instructions may include program modules, routines, programs, functions, procedures, methods, objects, and/or the like. The computer program(s) can be executed on one or more computers, such as on multiple computers that are in communication with one another.

The computer program(s) can be embodied on computer readable media (e.g., memory 252), which can be non-transitory and can include one or more storage devices, articles of manufacture, or the like. Exemplary computer readable media include computer system memory, e.g. RAM (random access memory), ROM (read only memory); semiconductor memory, e.g. EPROM (erasable, programmable ROM), EEPROM (electrically erasable, programmable ROM), flash memory; magnetic or optical disks or tapes; and/or the like. The computer readable medium may also include computer to computer connections, for example, when data is transferred or provided over a network or another communications connection (either wired, wireless, or a combination thereof). Any combination(s) of the above examples is also included within the scope of the computer-readable media. It is therefore to be understood that the method can be at least partially performed by any electronic articles and/or devices capable of carrying out instructions corresponding to one or more steps of the disclosed method. The method 500 then ends.

Figure 6:
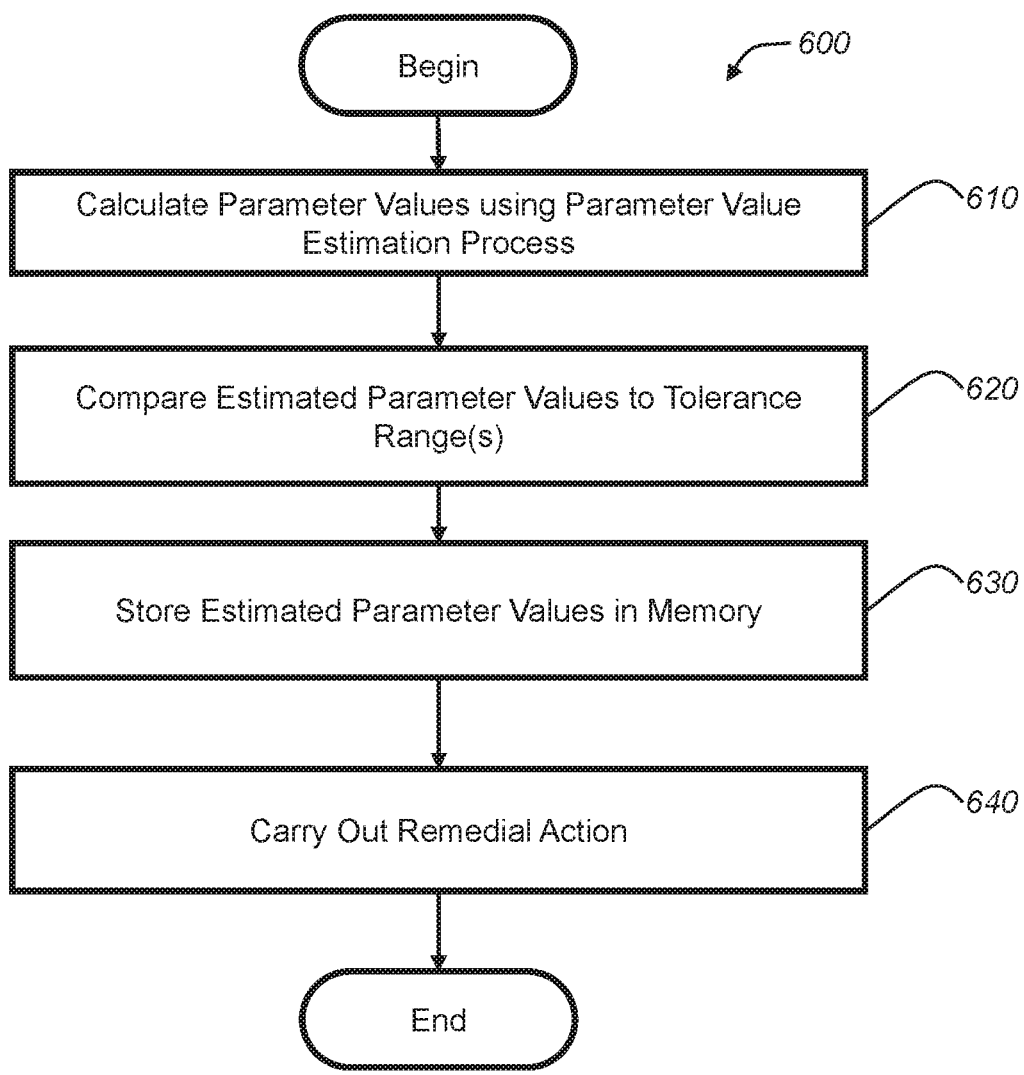
FIG. 6 is a flowchart of an embodiment of a method of detecting and responding to a failure of one or more vehicle components.

With reference to FIG. 6, there is shown an embodiment of a method 600 of detecting and responding to a failed or failing individual component or subsystem. Step 600 begins with step 610, where component parameter values (or component parameters) for the SUM 12, 212 are calculated. This calculation can use the parameter estimation process, which can include executing computer instructions embodied in an electronic, computer memory (e.g., memory 252), where the computer instructions include the parameter estimation steps used for obtaining the present state transition matrix estimate $\hat{A}_i$ and/or the present state input matrix estimate $\hat{B}_i$. Once these values are obtained, the particular values for certain components of the SUM 12 can be extracted and/or otherwise obtained from the present state transition matrix estimate $\hat{A}_i$ and/or the present state input matrix estimate $\hat{B}_i$. The method 600 then continues to step 620.

In step 620, each of the extracted or obtained parameter values can then be compared to a tolerance range for the particular component(s) associated with that tolerance range. When the parameter values fall within the tolerance range, then it can be determined that there is no failure. When the parameter values fall outside the tolerance range, then the level of failure can be determined. In such cases, the parameter values can be compared to a complete failure tolerance range (or limit), which can be used to determine whether a component has completely failed. When it is determined that the parameter values fall outside the complete failure tolerance range, then a component has completely failed; at this time, a warning can be issued, as discussed below in step 640. When it is determined that the parameter values fall outside the tolerance range, but within the complete failure tolerance range, then the time to failure estimation process discussed above can be carried out for the respective component. Using this process, a time to failure (TTF) value ($T_F$) can be obtained.

In step 630, the calculated parameter values can be stored in memory. In one embodiment, the parameter values can always be written to memory so that a history of these values can be maintained. In other embodiments, the parameter values may only be written to memory when the values fall outside the tolerance range and/or the complete failure tolerance range.

In step 640, a remedial action is carried out. In many embodiments, the remedial action can include issuing a notification when the parameter values fall outside the tolerance range (or when it is otherwise determined that the component is failing or has failed). The notification can include an alarm, warning, or other indication perceivable by a user or operator of the electronic system. For example, with reference to the vehicle 200 (FIG. 3), the failure detection module 216 can issue a notification via use of a visual display or other user interface 228. In another embodiment, the failure detection module 216 can send a message to the wireless communications module 230, which can then convert the message into a wireless signal that can be communicated to another device or system, and which can act to notify an operator and/or user of the electronic system. This notification can include a time to failure (TTF) and/or can indicate the severity of the failure. For example, the notification can indicate that the failure is a complete failure, a gradual failure (along with the TTF, at least in some embodiments), and/or other information, such as diagnostic trouble codes that may be retrieved from other system modules or from the communications bus 18, 218. In a particular embodiment involving an autonomous vehicle, the notification can be sent to the autonomous vehicle control system, to the vehicle operator owner, or to a driver. And, in this embodiment, where the vehicle is a level 4 (National Highway Traffic Safety Administration (NHTSA), where level 4 is full, self-driving automation), the notification can be sent to the driver. Or, in the case of a driverless vehicle, the notification can be used to switch to a redundant back-up hardware, such as where there is a total failure of the monitored component.

In many embodiments, the failures that are detected and/or identified can be categorized as one of the following: (1) total abrupt failure; (2) intermittent failure; or (3) gradual degradation in the functionality of the component over time. In the case (1) and/or (2) the failure may be considered a current failure, for which a notification or alert message can be sent from the FDS to one or more device-user interfaces 28, 228, such as a visual display, audio speaker, and/or a tactile feedback device. In the case (3) the failure may be considered a gradual failure for which the FDS can then begin a time to failure (TTF) estimation process that uses statistical modeling techniques to estimate a time to failure of the component. The TTF can be represented by an amount of time from the present time (or some other reference time) to the time when the component (e.g., individual component or subsystem) is expected or estimated to fail. A component can be said to "fail" when the component is incapable of performing its normal operations due to some internal failure or when the component is otherwise falling below some acceptable performance tolerance range, such as those tolerance ranges discussed above. In the latter category, the time to failure (TTF) of the component/subsystem can be estimated or, in general, the time to unacceptable performance of the system that incorporates the gradually failing component can be estimated (such as through use of the TTF estimation process. The method 600 then ends.

It is to be understood that the foregoing description is of one or more embodiments of the invention. The invention is not limited to the particular embodiment(s) disclosed herein, but rather is defined solely by the claims below. Furthermore, the statements contained in the foregoing description relate to the disclosed embodiment(s) and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art.

As used in this specification and claims, the terms "e.g.," "for example," "for instance," "such as," and "like," and the verbs "comprising," "having," "including," and their other verb forms, when used in conjunction with a listing of one or more elements or other items, are each to be construed as open-ended, meaning that the listing is not to be considered as excluding other, additional elements or items. Other terms are to be construed using their broadest reasonable meaning unless they are used in a context that requires a different interpretation. In addition, the term "and/or" is to be construed as an inclusive OR. Therefore, for example, the phrase "A, B, and/or C" is to be interpreted as covering all of the following: "A"; "B"; "C"; "A and B"; "A and C"; "B and C"; and "A, B, and C."

The invention claimed is:

1. A method of detecting and responding to a failure of one or more vehicle components, the method comprising:
   receiving system input at a failure detection module regarding the one or more vehicle components;
   determining a system state through use of one or more onboard vehicle sensors, wherein the system state relates to the one or more vehicle components;
   obtaining a nominal state transition matrix and a nominal state input matrix;
   calculating a present state transition matrix estimate and a present state input matrix estimate based on the nominal state transition matrix, the nominal state input matrix, the system input, and a sampled state derivative;
   detecting a failure of at least one of the vehicle components based on one or more component parameters of the present state transition matrix estimate and/or the present state input matrix estimate, wherein the one or more component parameters pertain to the at least one vehicle component; and
   performing a vehicle action in response to the detection of the failure.

2. The method of claim 1, wherein the detecting step further includes comparing the one or more component parameters of the present state transition matrix estimate and/or the present state input matrix estimate for a first vehicle component to a tolerance range for the first vehicle component.

3. The method of claim 2, wherein the detecting step further includes detecting whether the failure is an instant failure or a gradual failure.

4. The method of claim 3, wherein the performing step further includes:
   when it is detected that the failure is a current failure, issuing an instant alarm to a vehicle operator such that the issuance of the instant alarm constitutes the vehicle action; and
   when it is detected that the failure is a gradual failure, estimating a time to failure (TTF) and reporting the TTF to the vehicle operator or a vehicle services facility such that the estimation and report of the TTF constitutes the vehicle action.

5. The method of claim 1, wherein the one or more components are represented using a state variable model, wherein the state variable model is given by:

$$\dot{x}_k = A_i x_k + B_i u_k$$

where $x_k$ is the system state at time k, $u_k$ is the system input at time k, $A_i$ is a present state transition matrix, $B_i$ is a present state input matrix, and $\dot{x}_k$ is the sampled state derivative at time k.

6. The method of claim 5, wherein the present state transition matrix estimate $\hat{A}_i$ and the present input value estimate $\hat{B}_i$ are calculated by:
   estimating the sampled state derivative $\dot{x}_k$ based on measurements of the system state $x_k$ via at least some of the onboard vehicle sensors;
   calculating a present state transition matrix deviation $\Delta A$ and a present state input matrix deviation $\Delta B$ using the equation:

$$\Delta A x_k + \Delta B u_k = \dot{x}_k - A_s x_k - B_s u_k$$

where $A_S$ is the nominal state transition matrix and $B_S$ is the nominal state input matrix, wherein $\hat{A}_i = A_S + \Delta A$ and $\hat{B}_i = B_S + \Delta B$.

7. The method of claim 6, wherein the estimating step includes estimating the sampled state derivative $\dot{x}_k$ using the following equation:

$$\dot{x}_k = \frac{1}{2}\left[\frac{(x_{k+1} - x_k)}{(t_{k+1} - t_k)} + \frac{(x_k - x_{k-1})}{(t_k - t_{k-1})}\right]$$

where $x_{k+1}$ is the system state at time sample k+1, $x_{k-1}$ is the system state at time sample k−1, $t_k$ is the time at time sample k, $t_{k+1}$ is the time at time sample k+1, and $t_{k-1}$ is the time at time sample k−1.

8. The method of claim 1, wherein the onboard vehicle sensors include at least one vehicle system sensor and at least one supplemental sensor, wherein the system state is represented by one or more system state variables, and wherein each of the one or more system state variables is provided by at least one of the onboard vehicle sensors.

9. The method of claim 8, further comprising the step of: synchronizing the at least one vehicle system sensor with the at least one supplemental sensor so that sensor values associated with the at least one vehicle system sensor and the at least one supplemental sensor are synchronized with respect to time, wherein the synchronization step includes carrying out a time synchronization process for one or more of the at least one vehicle system sensor(s).

10. The method of claim 9, wherein the time synchronizing process includes carrying out each of the following steps for each of the one or more vehicle system sensor(s):
   obtaining a set of sensor values, wherein the set of sensor values includes a plurality of sensor values that are each taken at different times over a sample time interval;
   using a polynomial modeling technique to obtain a polynomial model of the set of sensor values over the sample time interval; and
   deriving one or more adjusted sensor values from the polynomial model that correspond in time to the sensor values associated with the at least one supplemental sensor.

11. The method of claim 1, wherein the receiving, determining, obtaining, and calculating steps comprise a parameter estimation process, wherein the detecting step is carried out using a failure detection filter (FDF), and wherein the FDF uses the present state transition matrix estimate and the present state input matrix estimate obtained from the parameter estimation process to carry out the detecting step.

12. A method of configuring a vehicle to detect and respond to a failure of one or more vehicle components, the method comprising:
constructing a state variable analytical model for a system under monitoring (SUM);
identifying system sensors that can be used to measure at least some state variables of the state variable analytical model;
developing a time synchronization process that is particular to the identified system sensors, wherein the time synchronization process enables sensor values obtained by the system sensors to be adjusted so as to obtain adjusted sensor values, wherein the adjusted sensor values conform to a unified sample time;
developing a parameter estimation process that can be used to obtain a present state transition matrix estimate and a present state input matrix estimate, wherein the parameter estimation process is developed based on the constructed state variable analytical model; and
configuring vehicle electronics of the vehicle to carry out the parameter estimation process and the time synchronization process.

13. The method of claim 12, further comprising the step of: compiling the parameter estimation process and the time synchronization process into a computer program.

14. The method of claim 13, wherein the configuring step includes installing the computer program into the vehicle electronics of the vehicle.

15. The method of claim 14, further comprising the steps of:
identifying one or more state variables of the state variable analytical model in which the vehicle is incapable of measuring using the system sensors; and
providing one or more supplemental sensors to measure the identified state variables, wherein the one or more supplemental sensors are configured to provide sensor values containing information relating to the identified state variables to the parameter estimation process.

16. The method of claim 12, wherein the development of the parameter estimation process includes constructing a nominal state transition matrix and a nominal state input matrix.

17. A vehicle failure detection system, comprising:
a system under monitoring (SUM) that includes one or more vehicle electronic system components;
one or more onboard vehicle sensors;
a failure detection module that includes:
a failure detection system (FDS) signal processor; and
a memory containing a computer program; and
a communication link between the failure detection model and the SUM;
wherein the failure detection module is configured to execute the computer program that is stored in the memory of the vehicle failure detection system using the failure detection signal processor, and wherein execution of the computer program by the failure detection signal processor causes the failure detection module to:
receive system input regarding the one or more vehicle electronic system components;
determine a system state through use of the one or more onboard vehicle sensors, wherein the system state concerns the one or more state variables;
obtain a nominal state transition matrix and a nominal state input matrix;
calculate a present state transition matrix estimate and a present state input matrix estimate based on the nominal state transition matrix, the nominal state input matrix, the system input, and a sampled state derivative;
detect a failure of at least one of the vehicle electronic system components based on one or more component parameters of the present state transition matrix estimate and/or the present state input matrix estimate, wherein the one or more component parameters pertain to the at least one vehicle electronic system component; and
perform a vehicle action in response to the detection of the failure.

18. The vehicle failure detection system of claim 17, wherein the one or more onboard vehicle sensors are either or both of system sensors or supplemental sensors, wherein the supplemental sensors are a part of the failure detection module, and wherein the system sensors are either or both of sensors included as a part of the SUM or other system sensors.

19. The vehicle failure detection system of claim 17, wherein the communication link is a direct, hardwired connection between the failure detection model and the SUM.

20. The vehicle failure detection system of claim 17, wherein the communication link is a vehicle communications bus.

\* \* \* \* \*